(12) United States Patent
Jia

(10) Patent No.: US 12,149,826 B2
(45) Date of Patent: Nov. 19, 2024

(54) IMAGE PROCESSING METHOD AND DEVICE, ELECTRONIC DEVICE, AND COMPUTER-READABLE STORAGE MEDIUM

(71) Applicant: GUANGDONG OPPO MOBILE TELECOMMUNICATIONS CORP., LTD., Dongguan (CN)

(72) Inventor: Yuhu Jia, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 170 days.

(21) Appl. No.: 17/673,249

(22) Filed: Feb. 16, 2022

(65) Prior Publication Data

US 2022/0174217 A1 Jun. 2, 2022

Related U.S. Application Data

(63) Continuation of application No. PCT/CN2019/102801, filed on Aug. 27, 2019.

(51) Int. Cl.
*H04N 23/68* (2023.01)
*G06T 5/50* (2006.01)
(Continued)

(52) U.S. Cl.
CPC ............. *H04N 23/683* (2023.01); *G06T 5/50* (2013.01); *G06T 7/55* (2017.01); *G06T 7/70* (2017.01);
(Continued)

(58) Field of Classification Search
CPC .. H04N 23/683; H04N 23/6811; H04N 23/90; H04N 23/6812; G06T 5/50;
(Continued)

(56) References Cited

U.S. PATENT DOCUMENTS

| 8,823,813 B2 | 9/2014 | Mantzel | |
|---|---|---|---|
| 2006/0195858 A1* | 8/2006 | Takahashi | G01C 21/3647 725/19 |

(Continued)

FOREIGN PATENT DOCUMENTS

| CN | 103745474 A | 4/2014 |
| CN | 109005355 A | 12/2018 |

(Continued)

OTHER PUBLICATIONS

International Search Report and the Written Opinion Dated May 20, 2020 From the International Searching Authority Re. Application No. PCT/CN2019/102801, 5 pages.

(Continued)

*Primary Examiner* — Jason A Flohre
(74) *Attorney, Agent, or Firm* — BAYES PLLC

(57) ABSTRACT

An image processing method includes a step for converting current posture information of a camera into target posture information, where the current posture information includes current angular velocity information. The method also includes a step for acquiring first depth information of each pixel point in an image to be processed under a current posture. The method also includes a step for determining second depth information of each pixel point under a target posture according to the first depth information. The method also includes a step for obtaining a target image according to the current posture information, the first depth information, the target posture information, the second depth information, and first internal parameter information of the camera.

18 Claims, 7 Drawing Sheets

(51) Int. Cl.
*G06T 7/55* (2017.01)
*G06T 7/70* (2017.01)
*H04N 23/90* (2023.01)

(52) U.S. Cl.
CPC ......... *H04N 23/6811* (2023.01); *H04N 23/90* (2023.01); *G06T 2207/20221* (2013.01); *G06T 2207/30244* (2013.01)

(58) Field of Classification Search
CPC ... G06T 7/55; G06T 7/70; G06T 2207/20221; G06T 2207/30244; G06T 5/73; G06T 2207/10024; G06T 2207/10028; G06T 2207/20201
See application file for complete search history.

(56) References Cited

U.S. PATENT DOCUMENTS

| | | | |
|---|---|---|---|
| 2008/0246848 A1* | 10/2008 | Tsubaki | G06T 7/20 348/208.4 |
| 2012/0307084 A1* | 12/2012 | Mantzel | H04N 23/68 348/208.6 |
| 2014/0176755 A1 | 6/2014 | Narita | |
| 2015/0103145 A1* | 4/2015 | Sakata | H04N 23/6811 348/222.1 |
| 2017/0206935 A1* | 7/2017 | Li | H04N 5/2621 |
| 2019/0045126 A1* | 2/2019 | Takeuchi | H04N 23/683 |
| 2019/0052810 A1* | 2/2019 | Tsubaki | H04N 23/6812 |

FOREIGN PATENT DOCUMENTS

| | | |
|---|---|---|
| CN | 109141433 A | 1/2019 |
| CN | 109544620 A | 3/2019 |
| CN | 109561254 A | 4/2019 |
| CN | 109714536 A | 5/2019 |
| CN | 109767467 A | 5/2019 |
| JP | 2014089168 A | 5/2014 |

OTHER PUBLICATIONS

The supplementary European search report dated Aug. 22, 2022 from European patent Application No. 19943025.7.
The Final Office Action dated May 31, 2023 from Chinese patent application No. 201980096840.3.
First Office Action Dated Feb. 3, 2023 From the Chinese Application No. 201980096840.3.
The Examination Report dated Jun. 26, 2024 from European patent application No. 19943025.7.
The Notice of Reexamination dated Sep. 25, 2024 from Chinese patent application No. 201980096840.3.

* cited by examiner

IMAGE PROCESSING METHOD AND DEVICE, ELECTRONIC DEVICE, AND COMPUTER-READABLE STORAGE MEDIUM

CROSS REFERENCE TO RELATED APPLICATIONS

This application is a continuation of International Application No. PCT/CN2019/102801, filed on Aug. 27, 2019, the entire content of which is incorporated herein by reference in its entirety.

FIELD OF DISCLOSURE

The present disclosure relates to the field of image technologies, in particular to an image processing method and device, an electronic device, and a computer-readable storage medium.

BACKGROUND

With the development of imaging technologies, people are gradually used to shoot images or videos through image acquisition devices, such as cameras on electronic devices, to record various information. In a shooting process, due to external shaking, it will cause jitters in the shooting image, resulting in a motion blur in the image and an unstable video. In order to ensure the quality of shooting, it is necessary to stabilize the shooting process.

However, most of traditional anti jitter solutions adopt simplified processing, and it is believed that all objects in the shooting image are on a unit plane, so an anti jitter effect for the shooting image is unstable.

SUMMARY OF DISCLOSURE

The disclose subject matter relates to an image processing method. The method includes a step for converting current posture information of a camera into target posture information. The current posture information includes current angular velocity information. The method also includes a step for acquiring first depth information of each pixel point in an image to be processed under a current posture of the camera. The method also includes a step for determining second depth information of each pixel point in the image to be processed under a target posture of the camera according to the target posture information and the first depth information of each pixel point in the image to be processed under the current posture. The method also includes a step for acquiring first internal parameter information of the camera, and a step for obtaining a target image through reprojecting the image to be processed according to the current posture information, the first depth information, the target posture information, the second depth information, and the first internal parameter information of the camera.

The disclose subject matter relates to a depth information acquisition method. The method includes a step for acquiring current posture information of a camera. The current posture information includes current angular velocity information. The method also includes a step for converting the current posture information into target posture information. The method also includes a step for acquiring first depth information of each pixel point in an image to be processed under a current posture of the camera. The method also includes a step for determining second depth information of each pixel point in the image to be processed under a target posture of the camera according to the target posture information and the first depth information of each pixel point in the image to be processed under the current posture.

The disclosed subject matter further relates to a terminal device. The terminal device includes one or more processors and a memory configured to store instructions which, when executed by the one or more processors cause the one or more processors to convert current posture information of a camera into target posture information. The current posture information includes current angular velocity information. The instructions also cause the one or more processors to acquire first depth information of each pixel point in an image to be processed under a current posture of the camera. The instructions also cause the one or more processors to determine second depth information of each pixel point in the image to be processed under a target posture of the camera according to the target posture information and the first depth information of each pixel point in the image to be processed under the current posture. The instructions also cause the one or more processors to obtain a target image through reprojecting the image to be processed according to the current posture information, the first depth information, the target posture information, the second depth information, and first internal parameter information of the camera.

The details of one or more implementations are set forth in the accompanying drawings and the description below. Other features and advantages will be apparent from the description and drawings, and from the claims.

BRIEF DESCRIPTION OF DRAWINGS

In order to more clearly describe technical solutions of embodiments of the present disclosure or the prior art, accompanying drawings for the description of the embodiments or the prior art will be briefly introduced in the following. Apparently, the drawings in the following description may show only some embodiments of the present disclosure. According to these drawings, other drawings may be further obtained by any ordinarily skilled person in the art without making creative efforts.

DETAILED DESCRIPTION

In order to make purposes, technical solutions, and advantages of the present disclosure clearer, the present disclosure is described in further detail below with reference to the accompanying drawings and embodiments. It should be understood that the specific embodiments described herein are only used to explain the present disclosure, and are not used to limit the present disclosure.

An image processing method and a depth information acquisition method in the embodiments of the present disclosure can be applied to electronic devices. The electronic device may be a computer device with a camera, a personal digital assistant, a tablet, a smart phone, a wearable device, etc.

Figure 1:
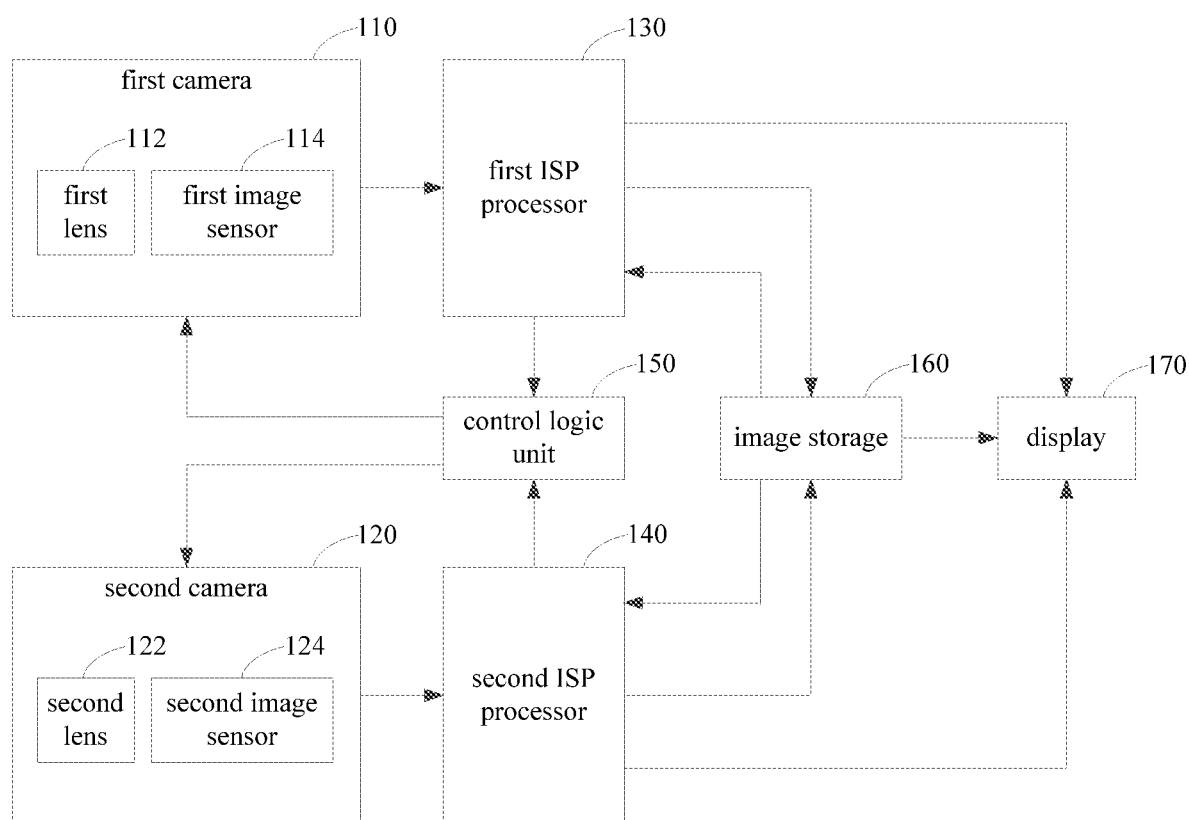
FIG. 1 illustrates a block diagram of an internal structure of an electronic device in one embodiment.

In one embodiment, the foregoing electronic device may include an image processing circuit, which may be implemented by hardware and/or software components, and may include various processing units that define an image signal processing (ISP) pipeline. FIG. 1 illustrates a schematic diagram of an image processing circuit in one embodiment. As illustrated in FIG. 1, for ease of description, only various aspects of the image processing technologies related to the embodiments of the present disclosure are shown.

As illustrated in FIG. 1, the image processing circuit includes a first ISP processor 130, a second ISP processor 140, and a control logic unit 150. A first camera 110 includes one or more first lenses 112 and a first image sensor 114. The first image sensor 114 may include a color filter array (e.g., a Bayer filter). The first image sensor 114 may acquire light intensity and wavelength information captured by each image pixel of the first image sensor 114, and provide a set of image data that can be processed by the first ISP processor 130. A second camera 120 includes one or more second lenses 122 and a second image sensor 124. The second image sensor 124 may include a color filter array (e.g., a Bayer filter). The second image sensor 124 can acquire light intensity and wavelength information captured by each image pixel of the second image sensor 124, and provide a set of image data that can be processed by the second ISP processor 140.

A first image acquired by the first camera 110 is transmitted to the first ISP processor 130 for processing. After processing the first image, the first ISP processor 130 may send statistical data of the first image (such as, a brightness of the image, a contrast value of the image, a color of the image, etc.) to the control logic unit 150. The control logic unit 150 can determine control parameters of the first camera 110 according to the statistical data. Thus, the first camera 110 can perform operations such as automatic focusing and automatic exposure according to the control parameters. The first image can be stored in an image storage 160 after being processed by the first ISP processor 130. The first ISP processor 130 can also read the image stored in the image storage 160 for processing.

In addition, the first image can be directly sent to a display 170 for display after being processed by the first ISP processor 130. The display 170 can also read the image in the image storage 160 for display.

The first ISP processor 130 may process the image data pixel by pixel in a plurality of formats.

For example, each image pixel may have a bit depth of 8, 10, 12, or 14 bits, and the first ISP processor 130 may perform one or more image processing operations on the image data, collect statistical information about the image data. The image processing operations may be performed with the same or different bit depth precision.

The image storage 160 may be, a portion of a storage, a storage device, or a separate dedicated memory within an electronic device, and may include direct memory access (DMA) features.

When receiving the image data from an interface of the first image sensor 114, the first ISP processor 130 may perform one or more image processing operations, for example, time-domain filtering. The processed image data may be sent to the image storage 160 for performing other processing before displaying. The first ISP processor 130 may further receive the processed data from the image storage 160 and perform image data processing on the processed data in color spaces of RGB and YCbCr. The image data processed by the first ISP processor 130 may be output to the display 170 for a user to view and/or for other processing by a graphics processing unit (GPU). In addition, output of the first ISP processor 130 may further be sent to the image storage 160, and the display 170 may read the image data from the image storage 160. In one embodiment, the image storage 160 may be configured to implement one or more frame buffers.

Statistical data determined by the first ISP processor 130 may be sent to the control logic unit 150.

For example, the statistical data may include statistical information about automatic exposure, automatic white balance, automatic focusing, scintillation detection, black level compensation, shading correction of the first lens 112 and the like of the first image sensor 114. The control logic unit 150 may include a processor and/microcontroller for executing one or more routines (for example, firmware), and the one or more routines may determine control parameters of the first camera 110 and control parameters of the first ISP processor 130 according to the received statistical data.

For example, the control parameters of the first camera 110 may include integral time for gain and exposure control, anti jitter parameters, scintillation control parameters, a control parameter (for example, a focal length for focusing or zooming) for the first lens 112, or a combination of these parameters. The control parameters for the ISP unit may include a gain level and color correction matrix for automatic white balance and color regulation (for example, during RGB processing) and a shading correction parameter for the first lens 112.

Similarly, a second image acquired by the second camera 120 is transmitted to the second ISP processor 140 for processing. After processing the second image, the second ISP processor 140 may send statistical data of the second image (such as, a brightness of the image, a contrast value of the image, a color of the image, etc.) to the control logic unit 150. The control logic unit 150 can determine control parameters of the second camera 120 according to the statistical data. Thus, the second camera 120 can perform operations such as automatic focusing and automatic exposure according to the control parameters. The second image can be stored in the image storage 160 after being processed by the second ISP processor 140. The second ISP processor 140 can also read the image stored in the image storage 160 for processing.

In addition, the second image can be directly sent to the display 170 for display after being processed by the second ISP processor 140. The display 170 can also read the image in the image storage 160 for display. The second camera 120 and the second ISP processor 140 can also implement the processing procedures described by the first camera 110 and the first ISP processor 130.

In one embodiment, the first camera 110 may be a color camera, and the second camera 120 may be a time of flight (TOF) camera or a structured light camera. The TOF camera may acquire a TOF depth image, and the structured light camera may acquire a structured light depth image. Both the first camera 110 and the second camera 120 may be color cameras. A binocular depth image is acquired through the two color cameras. The first ISP processor 130 and the second ISP processor 140 may be a same ISP processor.

When the first camera 110 is shooting, an image to be processed can be obtained through a preview screen. The image to be processed is sent to the ISP processor. The ISP processor can acquire current posture information of the camera when shooting. The current posture information includes current angular velocity information. The current posture information is then converted into target posture information. First depth information of each pixel point in the image to be processed under a current posture is acquired. Second depth information of each pixel point in the image to be processed under a target posture is determined according to the target posture information and the first depth information of each pixel point in the image to be processed under the current posture. First internal parameter information of the camera is acquired. A target image is obtained through reprojecting the image to be processed according to the current posture information, the first depth information, the target posture information, the second depth information, and the first internal parameter information. The accurate depth information of each pixel point under the current posture is determined, and the accurate depth information under the current posture is converted into the depth information under the target posture. Thus, a targeted reprojection processing can be performed on each pixel point to improve an overall anti jitter performance for the image.

Figure 2:
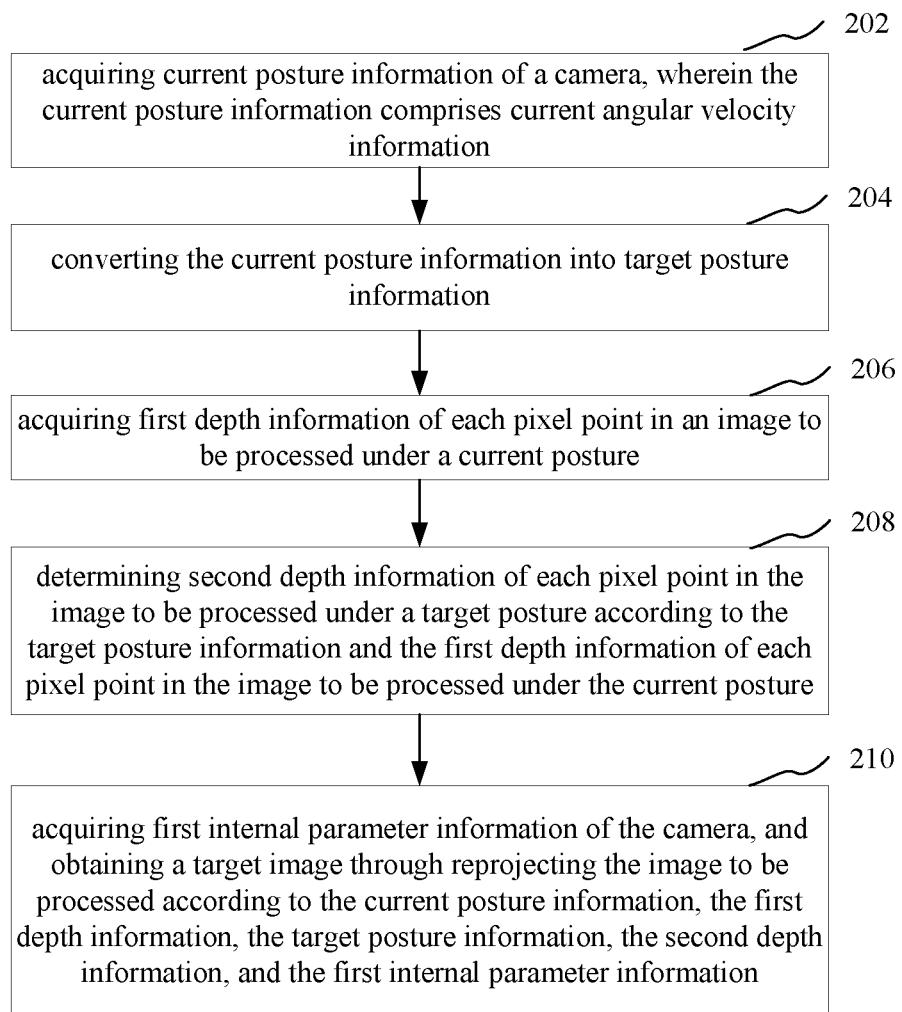
FIG. 2 illustrates a flowchart of an image processing method in one embodiment.

FIG. 2 illustrates a flowchart of an image processing method in one embodiment. As illustrated in FIG. 2, the image processing method includes the following.

In an operation 202, current posture information of a camera is acquired. The current posture information includes current angular velocity information.

The current posture information refers to information that characterizes a current posture of the camera. The current posture information includes the current angular velocity information. The current angular velocity information can be converted into a rotation matrix of the camera in a world coordinate system. Therefore, the rotation matrix can be used to characterize the current posture information of the camera.

Specifically, an ISP processor or a central processor of an electronic device can acquire a three-axis angular velocity of the camera through a gyroscope, and the three-axis angular velocity is corrected and integrated in a time domain, so as to output three-axis angular velocity information.

In an operation 204, the current posture information is converted into target posture information.

A target posture refers to a posture of the camera when an image to be processed captured under the current posture is reprojected and is in a stable state. The target posture information refers to information that can characterize the target posture.

Specifically, after the ISP processor or the central processor of the electronic device acquires the current posture information of the camera, it can make predictions based on the current posture and determine the target posture corresponding to the current posture. Furthermore, the current posture information can be converted into the target posture information through a target posture prediction algorithm.

In an operation 206, first depth information of each pixel point in an image to be processed under the current posture is acquired.

The first depth information refers to the accurate depth information corresponding to each pixel point in the image to be processed under the current posture. The image to be processed can be a complete image or a partial image.

Specifically, the ISP processor or the central processor of the electronic device can acquire the first depth information corresponding to each pixel point in the image to be processed under the current posture.

In an operation 208, second depth information of each pixel point in the image to be processed under the target posture is determined according to the target posture information and the first depth information of each pixel point in the image to be processed under the current posture.

The second depth information refers to depth information corresponding to each pixel point of the image to be processed under the target posture.

Specifically, after the ISP processor or the central processor of the electronic device converts the current posture information into the target posture information, the target posture corresponding to the current posture is obtained. According to the current posture and the target posture, the first depth information of each pixel point in the image to be processed under the current posture can be converted into the second depth information of each pixel point in the image to be processed under the target posture through coordinate transformation.

In an operation 210, first internal parameter information of the camera is acquired, and a target image is obtained through reprojecting the image to be processed according to the current posture information, the first depth information, the target posture information, the second depth information, and the first internal parameter information.

The first internal parameter information refers to real-time internal parameter information of the camera acquired under the current posture.

Specifically, the ISP processor or the central processor of the electronic device can acquire the first internal parameter information of the camera under the current posture. Then, the current posture information, the first depth information, the target posture information, the second depth information, and the first internal parameter information are input into a reprojection mapping algorithm to obtain pixel coordinates of the reprojection of each pixel point of the image to be processed can be obtained. The target image can be obtained by outputting the image according to the reprojected pixel coordinates of each pixel point in the image to be processed.

In the image processing method of the embodiment, the current posture information of the camera is acquired. The current posture information includes the current angular velocity information. The current posture information is converted into the target posture information. The first depth information of each pixel point in the image to be processed under the current posture is acquired. The second depth information of each pixel point in the image to be processed under the target posture is determined according to the target posture information and the first depth information of each pixel point in the image to be processed under the current posture. The first internal parameter information of the camera is acquired. The target image is obtained through reprojecting the image to be processed according to the current posture information, the first depth information, the target posture information, the second depth information, and the first internal parameter information. It can achieve targeted anti jitter for each pixel point, making the anti jitter performance of the captured image more stable.

Figure 3:
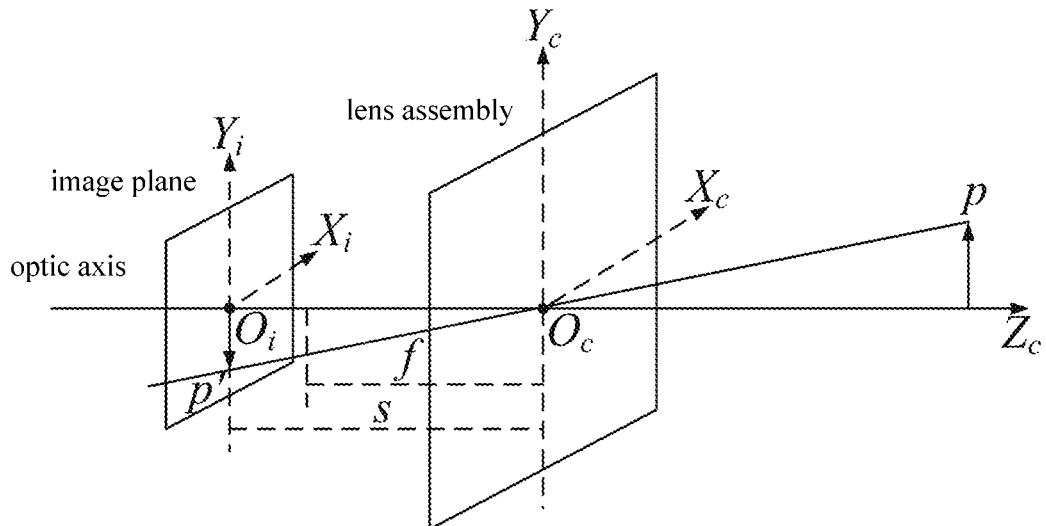
FIG. 3 illustrates a schematic diagram of a small hole imaging in one embodiment.

As illustrated in FIG. 3, which illustrates a schematic diagram of a small hole imaging in one embodiment, where f is a focal length of the camera, $c_x$ and $c_y$ are offsets of center coordinates of the camera, K is an internal parameter matrix of the camera including parameters f, $c_x$, and $c_y$, (x,y,z) is coordinates of a three-dimensional space point p under a world coordinate system, (u,v) is pixel coordinates of a pixel point p' of p, R and T are a rotation matrix and a translation matrix of the camera under the world coordinate system, which represent the current posture information of the camera, and $Z_c$ is an object distance of the three-dimensional space point p in a coordinate system of the camera. Under different camera postures, the coordinate system of the camera changes, and $Z_c$ will also change.

A mapping relationship between the three-dimensional space point and an image pixel coordinate in the image processing is as formula (1):

$$Z_c \begin{bmatrix} u \\ v \\ 1 \end{bmatrix} = \begin{bmatrix} f & 0 & c_x \\ 0 & f & c_y \\ 0 & 0 & 1 \end{bmatrix} \begin{bmatrix} R & T \\ 0 & 1 \end{bmatrix} \begin{bmatrix} x \\ y \\ z \end{bmatrix} = K \begin{bmatrix} R & T \\ 0 & 1 \end{bmatrix} \begin{bmatrix} x \\ y \\ z \end{bmatrix} \quad (1)$$

In order to obtain a stable output image, the image to be processed under the current posture can be reprojected to a posture where the camera posture is R' and T' (i.e., the target posture), and then a corresponding $Z'_c$ is calculated according to the target posture. The reprojection processing can be described as:

$$\begin{bmatrix} u \\ v \\ 1 \end{bmatrix} = \frac{Z'_c}{Z_c} K \begin{bmatrix} R' & T' \\ 0 & 1 \end{bmatrix} \begin{bmatrix} R & T \\ 0 & 1 \end{bmatrix}^{-1} K^{-1} \begin{bmatrix} u' \\ v' \\ 1 \end{bmatrix} \quad (2)$$

In one embodiment, the current posture information further includes at least one of current altitude information, current position information, and current geographic location information. The operation of acquiring the current posture information of the camera the following.

The current angular velocity information of the camera is acquired, and at least one of the current altitude information, the current position information, and the current geographic location information of the camera is acquired. A fusion processing is performed on at least one of the current altitude information, the current position information, and the current geographic location information with the current angular velocity information to obtain the current posture information of the camera.

The current altitude information refers to a height of the camera from a ground plane under the current posture. The current position information refers to an orientation of the camera under the current posture, such as east, south, west, and north. The current geographic location information refers to geographic coordinates of the camera under the current posture.

Specifically, the ISP processor or the central processor of the electronic device can acquire the angular velocity information of the camera under the current posture through the gyroscope, the height of the camera from the ground plane under the current posture through an altimeter, the orientation of the camera under the current posture through a compass, and the geographic coordinates of the camera under the current posture through a global positioning system (GPS).

Then, the ISP processor or the central processor of the electronic device can select at least one of the current altitude information, the current position information, and the current geographic location information. The fusion processing is performed on the selected information and the current angular velocity information to obtain the current posture information of the camera.

For example, the fusion processing is performed on the current altitude information and the current angular velocity information. The fusion processing is performed on the current position information and the current angular velocity information. The fusion processing is performed on the current geographic location information and the current angular velocity information. The fusion processing is performed on the current altitude information, the current position information, and the current angular velocity information. The fusion processing is performed on the current altitude information, the current geographic location information, and the current angular velocity information. The fusion processing is performed on the current position information, the current geographic location information, and the current angular velocity information. The fusion processing is performed on the current altitude information, the current position information, the current geographic location information, and the current angular velocity information. The current posture information of the camera can be obtained.

Furthermore, the selected information and the current angular velocity information can be subjected to a Kalman Filtering process to realize the fusion of the information and obtain the current posture information of the camera. The Kalman Filtering is essentially a data fusion algorithm, which fuse data with the same purpose, from different sensors, and with different units to obtain a more accurate target measurement value.

The image processing method of this embodiment, the current angular velocity information of the camera is acquired, and at least one of the current altitude information, the current position information, and the current geographic location information of the camera is acquired. A variety of different information used to characterize the current posture of the camera can be obtained. The fusion processing is performed on at least one of the current altitude information, the current position information, and the current geographic location information with the current angular velocity information to obtain the current posture information of the camera. A variety of ways to obtain the current posture information of the camera are provided. Through the fusion of different information, the current posture information of the camera can be obtained more accurately.

In one embodiment, the current posture information further includes current acceleration information. The method further includes an operation of acquiring the current acceleration information of the camera.

The operation of performing the fusion processing on at least one of the current altitude information, the current position information, and the current geographic location information with the current angular velocity information to obtain the current posture information of the camera includes that the fusion processing is performed on at least one of the current altitude information, the current position information, and the current geographic location information of the camera with the current angular velocity information and the current acceleration information to obtain the current posture information of the camera.

The current acceleration information refers to an acceleration of the camera under the current posture. The current acceleration information can be converted into the translation matrix of the camera under the world coordinate system. Therefore, the translation matrix serves as a component that characterizes the current posture information of the camera.

Specifically, the ISP processor or the central processor of the electronic device can acquire a three-axis acceleration through an accelerometer, and the three-axis acceleration can be corrected and integrated in two-time domains to obtain three-axis position information of the camera. The three-axis position information can be converted into the translation matrix of the camera under the world coordinate system. Then, at least one of the current altitude information, the current position information, and the current geographic location information of the camera can be selected, and the fusion processing is performed on the selected information with the current angular velocity information and the current acceleration information. The fusion processing can be implemented by fusion algorithms such as Kalman Filtering algorithm.

For example, the fusion processing is performed on the current altitude information, the current acceleration information, and the current angular velocity information. The fusion processing is performed on the current position information, the current acceleration information, and the current angular velocity information. The fusion processing is performed on the current geographic location information, the current acceleration information, and the current angular velocity information. The fusion processing is performed on the current altitude information, the current position information, the current acceleration information, and the current angular velocity information. The fusion processing is performed on the current altitude information, the current geographic location information, the current acceleration information, and the current angular velocity information. The fusion processing is performed on the current position information, the current geographic location information, the current acceleration information, and the current angular velocity information. The fusion processing is performed on the current altitude information, the current position information, the current geographic location information, the current acceleration information, and the current angular velocity information. The current posture information of the camera can be obtained.

In the image processing method of this embodiment, by acquiring the current acceleration information, the fusion processing is performed on at least one of the current altitude information, the current position information, and the current geographic location information with the current angular velocity information and the current acceleration information. A variety of ways to obtain the current posture information of the camera are provided. Also, the current acceleration information is also used as a reference for acquiring the current posture information, which can more accurately acquire the current posture information of the camera.

In this embodiment, the ISP processor or the central processor of the electronic device can also obtain an acceleration of gravity through a gravity sensor, select at least one of the current altitude information, the current position information, and the current geographic location information of the camera with the acceleration of gravity, and perform the fusion with the current angular velocity information to obtain the current posture information of the camera.

In one embodiment, the operation of converting the current posture information to the target posture information includes the following.

Current moving scenario information is acquired, and the target posture information is determined according to the current moving scenario information and the current posture information.

The current moving scenario information refers to a movement state of the camera during the shooting.

For example, when a user uses the camera to move and shoot horizontally, the camera is in a state of a horizontal movement.

Specifically, the ISP processor or the central processor of the electronic device can determine the movement state of the camera during the shooting process according to the current position information and the current geographic location information of the camera. Then, according to a current movement state of the camera, a direction in which the jitter needs to be eliminated under the current posture is determined.

For example, when moving and shooting horizontally, it is necessary to eliminate the jitter in roll and pitch directions as much as possible, while retaining the jitter in a yaw direction. Pitch is a direction of rotation around the x-axis, and an angle of rotation is a pitch angle. Yaw is a direction of rotation around the y-axis, and an angle of rotation is a yaw angle. Roll is a direction of rotation around the z-axis, and an angle of rotation is a roll angle. When the user holds the electronic device for shooting and keeps the position unchanged, it is necessary to eliminate jitter in all directions as much as possible to achieve an effect of a tripod.

Information in the direction in which the jitter needs to be eliminated in the current posture information can be subjected to a low-pass filtering process to remove a high-frequency component and retain a low-frequency component. Information in the direction where the jitter does not need to be eliminated is not processed, and the posture information for eliminating jitter according to the current movement state of the camera is output, and the target posture information can be obtained.

A traditional target posture prediction method only obtains the target posture by predicting the current posture. In this embodiment, according to the current movement state information of the camera, the direction of the jitter to be eliminated on the current posture and the direction of the jitter that does not need to be eliminated can be determined. The targeted processing of the information in all directions in the current posture information makes the predicted target posture information more accurate and more in line with an actual shooting scene.

In one embodiment, the operation of determining the target posture information according to the current moving scenario information and the current posture information includes the following. The current posture information is converted into a frequency domain space. According to the current moving scenario information, the current posture information in the frequency domain space is subjected to the low-pass filtering process. The current posture information subjected to the low-pass filtering process is converted into a time domain space to obtain the target posture information.

The time domain describes a relationship of mathematical functions or physical signals to time. For example, a time domain waveform of a signal can express a change of the signal over time. An independent variable of the frequency domain is the frequency, that is, a horizontal axis is the frequency, and a vertical axis is an amplitude of a frequency signal, which is a spectrogram. The spectrogram describes a frequency structure of the signal and a relationship between the frequency and the amplitude of the frequency signal.

Specifically, the ISP processor or the central processor acquires the angular velocity information through the gyroscope, and the angular velocity information is integrated in the time domain to obtain the current posture information in the time domain space. Then, the ISP processor or the central processor can convert the current posture information on the time domain space to the frequency domain space.

Then, the ISP processor or the central processor determines the direction of the jitter to be eliminated in the current posture information according to the movement state of the camera. The information in the direction in which the jitter needs to be eliminated in the current posture information is subjected to the low-pass filtering process to remove the high-frequency component in the information in the direction in which the jitter is to be eliminated in the current posture information, and retain the low-frequency component. The information in the direction where the jitter does not need to be eliminated in the current posture information is not processed, and the current posture information of the low-frequency component in the frequency domain space subjected to the low-pass filtering process is obtained.

Then, the ISP processor or the central processor converts the current posture information of the low-frequency component subjected to the low-pass filtering process to the time domain space. After the information subjected to the low-pass filtering process is converted from the frequency domain space to the time domain space, the obtained posture information is the target posture information.

The image processing method of this embodiment, the current posture information is converted into the frequency domain space, and the low-pass filtering process is performed on the current posture information of the frequency domain space according to the current moving scenario information of the camera. The information in the direction in which the jitter needs to be eliminated can be processed in a targeted manner. According to the current moving scenario information, the current posture information is accurately converted into the target posture information, so that the posture of the image to be processed in the stable state can be accurately predicted, that is, the target posture.

In one embodiment, the operation of acquiring the current moving scenario information includes the following.

The current position information and the current geographic location information of the camera are acquired. The fusion processing is performed on the current position information and the current geographic location information to obtain the current moving scenario information.

Specifically, the ISP processor or the central processor of the electronic device can acquire the current position information of the camera through the compass, and acquire the current geographic location information of the camera through the GPS positioning system. The current position information and the current geographic location information of the camera are subjected to the Kalman Filtering process to achieve the fusion of the two kinds of information, thereby obtaining the current moving scenario information.

In the image processing method of this embodiment, by acquiring the current position information and the current geographic location information of the camera, the change of the position and geographic coordinates of the camera can be determined. The current position information and the current geographic location information are subjected to the fusion processing. According to the change of the position and the geographic coordinates of the camera, the movement state of the camera during the shooting process can be determined intuitively and accurately.

In one embodiment, the operation of acquiring of the first depth information of each pixel point in the image to be processed under the current posture includes the following.

At least two depth information of initial depth information, third depth information, and fourth depth information are acquired. The initial depth information is depth information of each pixel point in the image to be processed under the current posture acquired by a depth camera. The third depth information is depth information of each pixel point in the image to be processed under the current posture acquired by a dual-camera parallax ranging method. The fourth depth information is depth information of each pixel point in the image to be processed under the current posture acquired by a phase focusing method. A fusion correction processing is performed on the at least two acquired depth information to obtain the first depth information of each pixel point in the image to be processed under the current posture.

The fusion correction processing refers to the analysis and selection of different information of the same image to be processed obtained in different ways, so as to fuse different information obtained in different ways into the same image. The first depth information refers to a more accurate depth information of each pixel point in the image to be processed under the current posture.

Specifically, the ISP processor or the central processor of the electronic device can acquire the initial depth information of each pixel point in the image to be processed under the current posture through the depth camera, acquire the third depth information of each pixel point in the image to be processed under the current posture through the dual-camera parallax ranging method, and also acquire the fourth depth information of each pixel point in the image to be processed under the current posture through the phase focusing method. In this embodiment, the ISP processor or the central processor of the electronic device can acquire the depth information of each pixel point in the same image to be processed under the current posture through at least two of the above three methods to obtain at least two of the initial depth information, the third depth information, and the fourth depth information.

The ISP processor or the central processor of the electronic device can fuse and superimpose the depth information acquired in at least two ways, so as to integrate the at least two acquired depth information. The depth information of each pixel point obtained after the fusion correction processing is the first depth information of each pixel point in the image to be processed under the current posture.

In the image processing method of this embodiment, the depth information of the same image to be processed under the current posture is acquired in at least two ways to obtain at least two types of depth information. By fusing and superimposing at least two kinds of acquired depth information with each other, richer and more comprehensive detail information can be obtained, and thus more accurate depth information of each pixel point in the image to be processed can be obtained.

In this embodiment, the initial depth information of the image to be processed can be acquired through the TOF camera, or through the dual-camera, and the initial depth information of the image to be processed can also be acquired through the structured light camera, an infrared camera, etc.

In this embodiment, an initial image can be collected by the TOF camera, and the low-resolution area in the initial image can be interpolated, or the entire initial image can be interpolated to obtain the image be processed with a higher resolution than the initial image. Interpolation processing methods include, but are not limited to, bi-square interpolation and bi-cubic interpolation.

In one embodiment, the depth information includes a depth value. The operation of performing the fusion correction processing on the at least two acquired depth information to obtain the first depth information of each pixel point in the image to be processed under the current posture includes the following.

A mean value of the at least two depth information corresponding to each pixel point us determined. The mean value corresponding to each pixel point serves as a first depth value of each pixel point in the image to be processed under the current posture.

Specifically, the ISP processor or the central processor of the electronic device can acquire the depth information of each pixel point in the same image to be processed under the current posture in three ways, and three kinds of depth information corresponding to each pixel point can be obtained. That is, each pixel point in the image to be processed corresponds to the initial depth information, the third depth information, and the fourth depth information. The ISP processor or the central processor of the electronic device can acquire at least two kinds of depth information corresponding to each pixel point, and calculate the mean value of the acquired at least two kinds of depth information to obtain the mean value corresponding to each pixel point. The mean value corresponding to each pixel point serves as the first depth value of each pixel point in the image to be processed under the current posture.

It is understandable that the depth information selected by all pixel points is the depth information acquired in the same way, for example, the corresponding initial depth information and the third depth information are acquired for each pixel point. The corresponding initial depth information and the fourth depth information are acquired for each pixel point. The corresponding third depth information and the fourth depth information are acquired for each pixel point. The corresponding initial depth information, the third depth information, and the fourth depth information are acquired for each pixel point.

In the image processing method of this embodiment, the mean value of at least two depth information corresponding to each pixel point is determined. The mean value corresponding to each pixel point serves as the first depth value of each pixel point in the image to be processed under the current posture. A variety of ways to obtain the first depth value are provided. Through the fusion of different depth information, richer detailed information can be obtained in the image to be processed, so that the calculated depth information of each pixel point in the image to be processed is more accurate.

Figure 4:
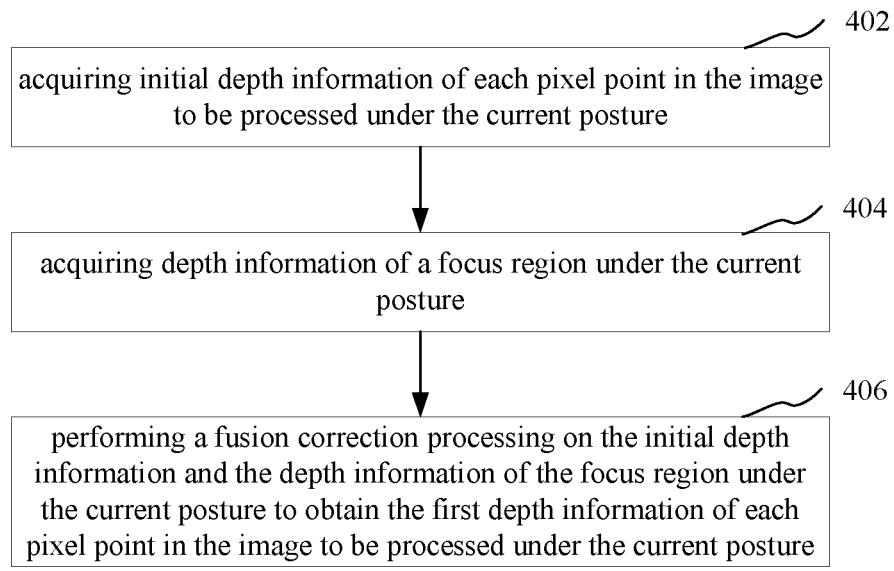
FIG. 4 illustrates a flowchart of an operation of acquiring first depth information of each pixel point in an image to be processed under a current posture in one embodiment.

In one embodiment, as illustrated in FIG. 4, the operation of acquiring the first depth information of each pixel point in the image to be processed under the current posture includes the following.

In an operation 402, initial depth information of each pixel point in the image to be processed under the current posture is acquired.

Specifically, the ISP processor or the central processor of the electronic device can use the depth camera to shoot the image to be processed of the same scene under the current posture, and the initial depth information of each pixel point in the image to be processed can be directly acquired.

In this embodiment, the depth camera may be the TOF camera, the dual-camera, the structured light camera, and so on. The ISP processor or the central processor of the electronic device can directly capture the image to be processed under the current posture through an image acquisition device such as the TOF camera, the dual-camera, and the structured light camera. No other conversion processing is required, and the depth information of each pixel point in the image to be processed can be acquired simply and quickly, thereby increasing a speed of image processing.

In an operation 404, depth information of a focus region under the current posture is acquired.

Specifically, the ISP processor or the central processor of the electronic device can determine the same scene currently being shot. After a lens is driven by a motor for optical focusing, a focus position (i.e., the focus region) under the current posture can be determined. According to a corresponding relationship between the preset focus position and a focal length value, and a mapping relationship between the focal length value and the depth information, the depth information corresponding to each pixel point in the focus region under the current posture can be acquired.

In an operation 406, a fusion correction processing is performed on the initial depth information and the depth information of the focus region under the current posture to obtain the first depth information of each pixel point in the image to be processed under the current posture.

Specifically, the accuracy of the depth information of the image to be processed acquired by direct shooting with the depth camera is not as high as that of the depth information acquired during the optical focusing. That is, the accuracy of the initial depth information of each pixel point in the image to be processed under the current posture acquired through the depth camera is lower than the accuracy of the depth information of the focus region under the current posture after the optical focusing. Thus, the ISP processor or the central processor of the electronic device can fuse and superimpose the depth information of the focus region under the current posture and the depth information of the image to be processed directly captured by the depth camera, such that the depth information of each pixel point in the image to be processed under the current posture can reach the accuracy of the depth information of the focus region, so that the first depth information of each pixel point in the image to be processed under the current posture can be obtained.

In the image processing method of this embodiment, the initial depth information of each pixel point in the image to be processed under the current posture is acquired, the depth information of the focus region under the current posture is acquired, and two kinds of depth information with different precision of the same image to be processed under the current posture can be obtained. The fusion correction processing is performed on the initial depth information and the depth information of the focus region under the current posture to obtain the first depth information of each pixel point in the image to be processed under the current posture. High-precision partial depth information can be applied to each part of the image to be processed. Thus, more accurate depth information of the image to be processed is acquired, that is, the first depth information of each pixel point in the image to be processed under the current posture is acquired.

In one embodiment, the depth information includes a depth value. The operation of performing the fusion correction processing on the initial depth information and the depth information of the focus region under the current posture to obtain the first depth information of each pixel point in the image to be processed under the current posture includes the following. A pixel point in the image to be processed under the current posture that matches a pixel point of the focus region under the current posture is determined. A difference value or a ratio between the depth value of the focus region and an initial depth value of the matched pixel point in the image to be processed is determined. According to the initial depth information of each pixel point in the image to be processed under the current posture and the difference value or the ratio, the first depth information of each pixel point in the image to be processed under the current posture is determined.

Specifically, the ISP processor or the central processor of the electronic device can acquire the depth information of the focus region under the current posture, and acquire a partial depth information of a partial image in the focus region in the image to be processed. The ISP processor or the central processor of the electronic device can further determine the depth value of the focus region. Then, each pixel point in the partial image of the focus region is matched with each pixel in the image to be processed under the current posture. The pixel point of the partial image in the focus region and a corresponding pixel point in the image to be processed under the current posture are determined.

In this embodiment, there are a plurality of pixel points in the focus region, and the depth value of each pixel point is the same. The plurality of pixel points refer to at least two pixel points.

Then, the ISP processor or the central processor of the electronic device acquires the initial depth value of the pixel point that is successfully matched in the image to be processed under the current posture, acquires the depth value of the focus region, and calculates the difference value between the two-pixel points that match successfully, so as to obtain the difference value corresponding to each successfully matched pixel point. Alternatively, the ratio between the two-pixel points that match successfully is calculated, and the ratio corresponding to each pixel point that matches successfully is obtained.

Then, the ISP processor or the central processor of the electronic device can determine a first adjustment value according to the difference value corresponding to each pixel point that is successfully matched. The first adjustment value is added to the initial depth value of each pixel point in the image to be processed under the current posture to obtain first depth value of each pixel point in the image to be processed under the current posture. The first depth value of each pixel point is the first depth information corresponding to each pixel point in the image to be processed under the current posture.

Alternatively, the ISP processor or the central processor of the electronic device may determine a second adjustment value according to the ratio corresponding to each pixel point that is successfully matched. The initial depth value of each pixel point in the image to be processed under the current posture is multiplied by the second adjustment value to obtain the first depth value of each pixel point in the image to be processed under the current posture. The first depth value of each pixel point is the first depth information corresponding to each pixel point in the image to be processed under the current posture.

In this embodiment, the operation of determining the first adjustment value according to the difference value corresponding to each successfully matched pixel point includes the following. A middle value, a maximum value, or a minimum value of each difference value corresponding to the matched pixel point is determined. Any one of the middle value, the maximum value, and the minimum value serves as the first adjustment value.

In this embodiment, the operation of determining the second adjustment value according to the ratio corresponding to each successfully matched pixel point includes the following. A middle value, a maximum value, or a minimum value of each difference value corresponding to the matched pixel point is determined. Any one of the middle value, the maximum value, and the minimum value serves as the second adjustment value.

In the image processing method of this embodiment, the difference value or the ratio between the depth value of the focus region and the initial depth value of the matching pixel point in the image to be processed is determined. The difference between the depth value of the focus region and the initial depth value of the matching pixel point in the image to be processed can be determined. According to the difference value or the ratio and the initial depth information of each pixel point in the image to be processed under the current posture, the depth information of the partial image of the focus region and the initial depth information of the image to be processed can be fused to obtain an accurate depth information of each pixel point in the image to be processed under the current posture, thereby improving the accuracy of the depth information of the image to be processed.

In one embodiment, the operation of acquiring the depth information of the focus region under the current posture includes the following.

The focus region under the current posture is determined. The corresponding focal length value is acquired according to the focus region. The corresponding depth information is acquired according to the focal length value. The depth information corresponding to the focal length value serves as the depth information of the focus region under the current posture.

The focus region is a focus position after the motor drives the lens to focus.

Specifically, the ISP processor or the central processor of the electronic device can determine the current focus position after the motor drives the lens to focus, and acquire the focal length value corresponding to the focus region under the current posture according to the corresponding relationship between the preset focus region and the focal length value. The focal length value corresponding to the focus region under the current posture is the focal length value of the lens under the current posture. Then, through the corresponding relationship between the focal length value and the depth information of the preset lens, the depth information corresponding to the focal length value of the lens under the current posture is obtained. The depth information corresponding to the focal length value of the lens under the current posture serves as the depth information of the focus region under the current posture.

In the image processing method of this embodiment, the focal length value corresponding to the focus region under the current posture can be acquired according to the corresponding relationship between the preset focus region and the focal length value. According to the corresponding relationship between the preset focal length value and the depth information, the depth information corresponding to the focal length value of the lens under the current posture is acquired. Thus, the depth information corresponding to the focus region under the current posture can be acquired indirectly.

In one embodiment, the operation of acquiring the corresponding focal length value according to the focus region includes the following.

A mapping relationship between the focus region and the focal length value is acquired, and the focal length value corresponding to the focus region is acquired according to the mapping relationship.

Specifically, the mapping relationship between the focus region and the focal length value is preset. The ISP processor or the central processor of the electronic device can acquire the mapping relationship. A focus region as the same as the focus region under the current posture is determined from the mapping relationship. The focal length value corresponding to the same focus region in the mapping relationship is acquired. The focal length value is the focal length value corresponding to the focus region under the current posture. Thus, the focal length value corresponding to the focus region under the current posture can be quickly acquired through the preset mapping relationship between the focus region and the focal length value.

In one embodiment, the mapping relationship between the focus region and the focal length value may be embodied by a relationship mapping table. The operation of acquiring the mapping relationship between the focus region and the focal length value, and acquiring the focal length value corresponding to the focus region according to the mapping relationship includes the following.

The relationship mapping table is acquired. The focal length value corresponding to the focus region is acquired from the relationship mapping table. The mapping relationship between the focus region and the focal length value is recorded in the relationship mapping table.

The relationship mapping table is a table of the corresponding relationship between the preset focus region and the focus value, and is configured to record the mapping relationship between the focus region and the focal length value.

Specifically, the ISP processor or the central processor of the electronic device can obtain the relationship mapping table. Compare the focus region under the current posture with the focus region in the relationship mapping table one by one to determine the focus region in the relationship mapping table as the same as the focus region under the current posture. Then, the focal length value corresponding to the same focus region in the relationship mapping table can be acquired. The focal length value is the focal length value corresponding to the focus region under the current posture. The focal length value corresponding to the focus region under the current posture can be quickly and simply acquired through the relationship mapping table.

In one embodiment, the operation of acquiring the corresponding depth information according to the focal length value includes the following.

A focus curve is acquired, and the depth information corresponding to the focal length value is acquired from the focus curve. The focus curve is a correlation curve between the focal length value and the depth information.

The focus curve is the correlation curve between the focal length value of the current lens and the depth information of the focus region.

Specifically, the focus curve is a curve established in advance according to the focal length value and depth information. Each focal length value corresponds to one depth information. The ISP processor or the central processor of the electronic device can acquire the focus curve. According to the corresponding relationship between the recorded focal length value of the lens in the focus curve and the depth information of the focus region, the depth information that the focal length value corresponding to the focus region under the current posture has a mapping relationship can be acquired. The depth information serves as the depth information of the focus region under the current posture. Through the focus curve, the depth information corresponding to the focal length value of the focus region under the current posture can be quickly and simply acquired, so that the depth information corresponding to the focus region under the current posture can be obtained indirectly.

In one embodiment, the operation of determining the first depth information of each pixel point in the image to be processed under the current posture and the second depth information of each pixel point in the image to be processed under the target posture according to the target posture information includes following.

A first three-dimensional coordinate corresponding to each pixel point in the image to be processed under the current posture is acquired. The first three-dimensional coordinate is converted into a second three-dimensional coordinate according to the target posture information by using a coordinate conversion algorithm to obtain the second depth information of each pixel point in the image to be processed under the target posture. The second three-dimensional coordinate is a three-dimensional coordinate corresponding to each pixel point in the image to be processed under the target posture.

Specifically, the ISP processor or the central processor of the electronic device acquires the three-dimensional coordinate of each pixel point in the image to be processed under the current posture in the world coordinate system, that is, the first three-dimensional coordinate. The first three-dimensional coordinate corresponding to each pixel point under the current posture is converted into the second three-dimensional coordinate under the target posture through the coordinate conversion algorithm. Furthermore, the second three-dimensional coordinate is the three-dimensional coordinate of each pixel point in the image to be processed under the target posture in the world coordinate system. Through the coordinate conversion algorithm, the three-dimensional coordinate of each pixel point in the image to be processed can be converted from the current posture to the target posture, thereby determining the reprojection method of each pixel point.

For example, the coordinate conversion algorithm is:

$$\begin{bmatrix} x' \\ y' \\ z' \end{bmatrix} = \begin{bmatrix} R' & T' \\ 1 & 0 \end{bmatrix}^{-1} \begin{bmatrix} R & T \\ 1 & 0 \end{bmatrix} \begin{bmatrix} x \\ y \\ z \end{bmatrix} \quad (3)$$

(x,y,z) is the first three-dimensional coordinate corresponding to each pixel point under current posture. (x', y', z') is the second three-dimensional coordinate corresponding to each pixel point under target posture. R and T are the rotation matrix and the translation matrix of the camera under the current posture in the world coordinate system, and characterize the current posture information of the camera. R' and T' are the rotation matrix and the translation matrix of the camera under the target posture in the world coordinate system, and characterize the target posture information of the camera. The ISP processor or the central processor of the electronic device acquires (x,y,z) of each pixel point of the image to be processed under the current posture. According to the current posture information and the target posture information, R, T, R', and T' are obtained. Substituting these data into the coordinate conversion algorithm mentioned above, (x', y', z') corresponding to each pixel point can be calculated.

In the image processing method of this embodiment, by using the coordinate conversion algorithm, the coordinate of each pixel point in the image to be processed under the current posture is converted into a corresponding coordinate under the target posture. Thus, the reprojection processing can be performed on each pixel point in a targeted manner to achieve targeted anti jitter for each pixel point.

Figure 5:
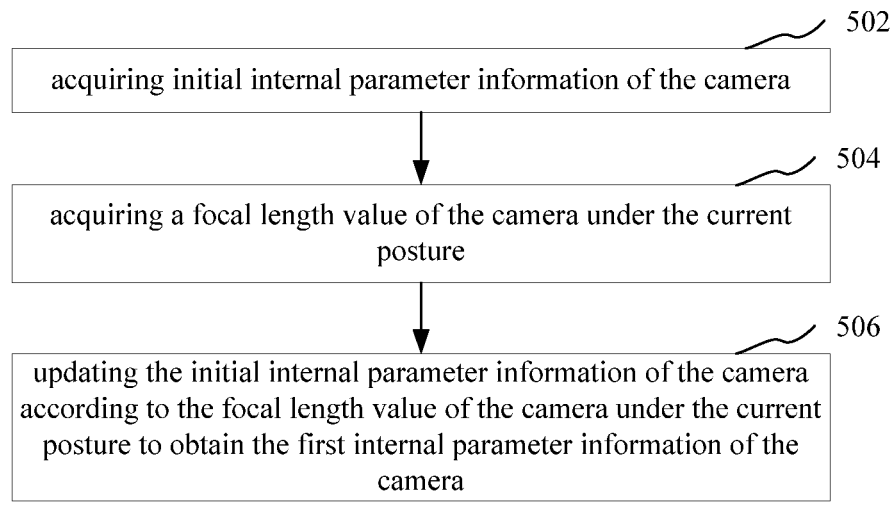
FIG. 5 illustrates a flowchart of an operation of acquiring first internal parameter information of a camera in one embodiment.

In one embodiment, as illustrated in FIG. 5, the operation of acquiring of the first internal parameter information of the camera includes the following.

In an operation 502, initial internal parameter information of the camera is acquired.

In an operation 504, a focal length value of the camera under the current posture is acquired.

The initial internal parameter information is preset internal parameter information of the camera at a specific focus distance.

Specifically, the camera needs to be calibrated before it leaves a factory. The initial internal parameter information is the preset internal parameter information at a specific focus distance before the camera leaves the factory. The ISP processor or the central processor of the electronic device acquires the initial internal parameter information of the camera. The initial internal parameter information includes the focal length value and a center coordinate offset of the camera. When focusing, the focal length value of the lens will change at different focusing positions. The ISP processor or the central processor of the electronic device can acquire the real-time focal length value of the lens of the camera according to the focus region under the current posture.

In an operation 506, the initial internal parameter information of the camera is updated according to the focal length value of the camera under the current posture to obtain the first internal parameter information of the camera.

The first internal parameter information is the internal parameter information acquired after updating at least one of the focal length value and the offset in the initial internal parameter information.

Specifically, the ISP processor or the central processor of the electronic device can replace the focal length value in the initial internal parameter information of the camera with the focal length value of the lens under the current posture, thereby updating the internal parameter information. The updated internal parameter information is the first internal parameter information of the camera.

In the image processing method of this embodiment, the real-time focal length value of the camera under the current posture is acquired to update the internal parameter information of the camera. It can solve the problem that the pixel points in the image to be processed are projected to the same unit plane with the same focal length value in a traditional image processing method, resulting in the inability to detect a true depth information of each pixel point of the image. The image processing method of this embodiment improves the accuracy of the detection of depth information.

Figure 6:
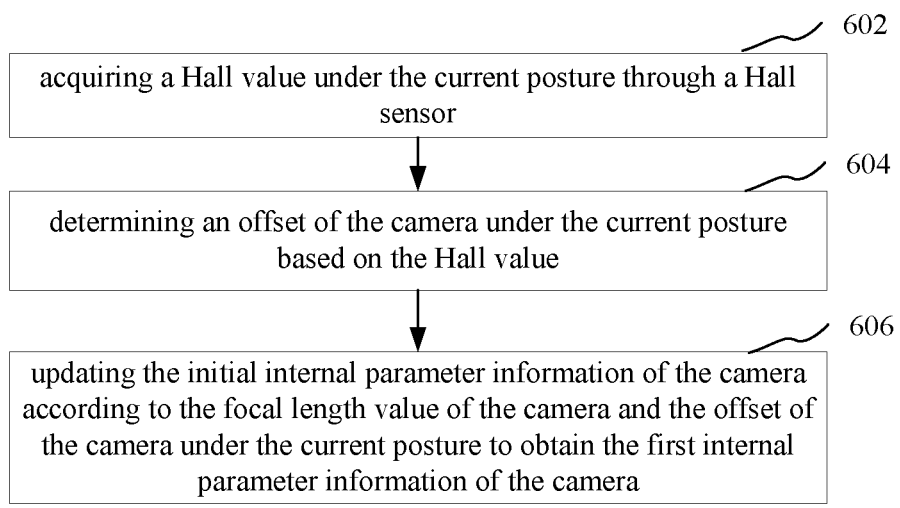
FIG. 6 illustrates a flowchart of an operation of acquiring first internal parameter information of a camera in another embodiment.

In one embodiment, as illustrated in FIG. 6, the method further includes the following.

In an operation 602, a Hall value under the current posture is acquired through a Hall sensor.

In an operation 604, an offset of the camera under the current posture is determined based on the Hall value.

The Hall sensor is a magnetic field sensor made according to a Hall effect. The Hall effect is essentially the deflection caused by a Lorentz force of moving charged particles in a magnetic field. When the charged particles (electrons or holes) are confined in a solid material, this deflection results in an accumulation of positive and negative charges in a direction of the vertical current and magnetic field, thereby forming an additional lateral electric field.

Specifically, the electronic device can record an offset scale of the lens of the camera on an XY plane through the Hall sensor. While recording the offset scale, a direction of the offset can also be recorded. According to a distance corresponding to each scale and the offset direction, the lens offset $(c_x,c_y)$ is then obtained. In the embodiment of the present disclosure, a size of the Hall value collected by the Hall sensor can be known to uniquely determine a size of the lens offset at a current moment. The angular velocity information collected by the gyroscope sensor corresponds to the Hall value collected by the Hall sensor in time sequence.

The operation of updating the initial internal parameter information of the camera according to the focal length value of the camera under the current posture to obtain the first internal parameter information of the camera includes the following.

In an operation 606, the initial internal parameter information of the camera is updated according to the focal length value of the camera and the offset of the camera under the current posture to obtain the first internal parameter information of the camera.

Specifically, the initial internal parameter information of the camera includes the focal length value f of the camera, the offset $c_x$ of the camera on an X plane, and the offset $c_y$ of the camera on the X plane. The ISP processor or the central processor of the electronic device can acquire the offset of the camera and the focal length value of the current lens under the current posture, and replace the offset and the focal length value in the initial internal parameter information, so as to obtain the first internal parameter information of the camera.

In the image processing method of this embodiment, the Hall value under the current posture is acquired through the Hall sensor, and the offset of the camera under the current posture is determined based on the Hall value, so as to obtain the real-time offset of the camera. The initial internal parameter information of the camera is updated according to the focal length value of the camera and the offset of the camera under the current posture, which can better meet the anti jitter requirements of shooting under zooming conditions.

Figure 7:
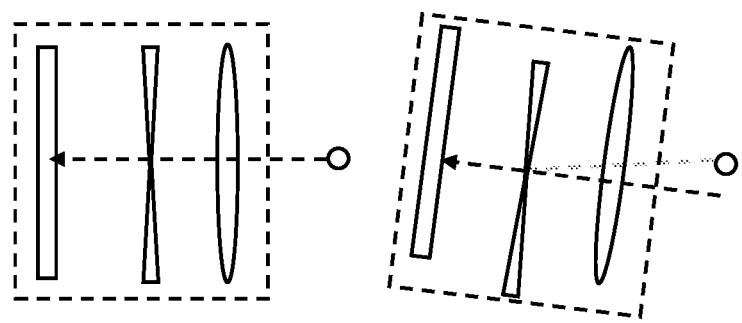
FIG. 7 illustrates a schematic diagram of an optical image stabilization in one embodiment.

As illustrated in FIG. 7, which illustrates a schematic diagram of an optical image stabilization in one embodiment. The optical image stabilization generally compensates for a posture difference caused by a rotation of the camera by moving the lens on the x and y axes. The posture difference is a difference between the current posture of the camera and the target posture.

Figure 8:
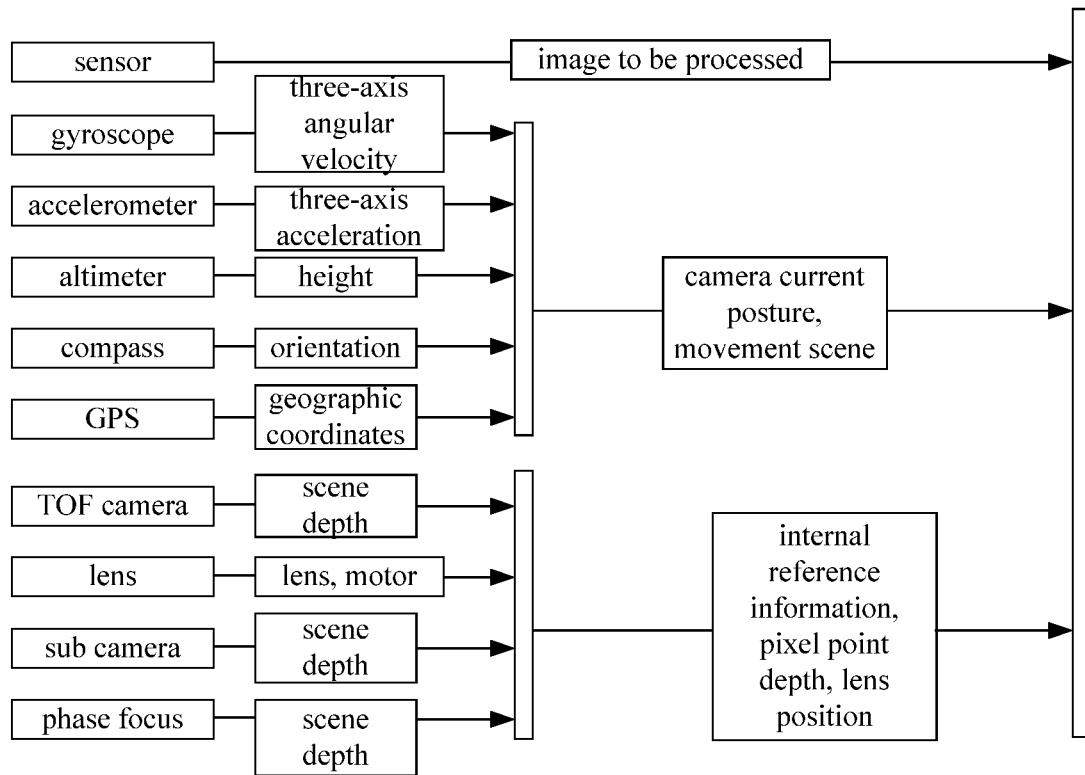
FIG. 8 illustrates a schematic diagram of an image processing method in one embodiment.

As illustrated in FIG. 8, which illustrates a schematic diagram of an image processing method in one embodiment.

The IPS processor or the central processor of the electronic device acquires a current three-axis angular velocity information through the gyroscope, acquires a current three-axis acceleration information through the accelerometer, acquires a current altitude information through the altimeter, acquires a current position information through the compass, and acquires a current geographic location information through GPS positioning system. Then, the current three-axis angular velocity information, the current three-axis acceleration information, the current altitude information, the current position information, and the current geographic location information are fused to obtain the current posture information of the camera. The IPS processor or the central processor of the electronic device can also acquire the depth information of each pixel point in the same image to be processed under current posture through the dual-camera parallax ranging method, the phase focusing method, and the TOF camera. The three depth information acquired by the three methods are combined to obtain the accurate depth information of each pixel point in the image to be processed under current posture. The IPS processor or the central processor of the electronic device also drives the lens to focus through the motor, and updates the initial internal parameter information of the camera according to the lens position, the focal length, and the offsets in the X and Y directions. Then, the IPS processor or the central processor of the electronic device can perform the reprojection processing on the image to be processed according to the current posture information of the camera, the current moving scenario information, the updated internal reference information, and the accurate depth information of each pixel point, to output a stable target image.

In one embodiment, an image processing method is provided, including the following.

In an operation (b1), the current angular velocity information and the current acceleration information of the camera are acquired, and at least one of the current altitude information, the current position information, and the current geographic location information of the camera is acquired.

In an operation (b2), the fusion processing is performed on at least one of the current altitude information, the current position information, and the current geographic location information of the camera with the current angular velocity information and the current acceleration information to obtain the current posture information of the camera.

In an operation (b3), the fusion processing is performed on the current position information and the current geographic location information to obtain the current moving scenario information.

In an operation (b4), according to the current moving scenario information and the current posture information, the target posture information is determined.

In an operation (b5), at least two depth information of the initial depth information, the third depth information, and the fourth depth information are acquired. The initial depth information is depth information of each pixel point in the image to be processed under the current posture acquired by the depth camera.

In an operation (b6), the third depth information is depth information of each pixel point in the image to be processed under the current posture acquired by the dual-camera parallax ranging method.

In an operation (b7), the fourth depth information is depth information of each pixel point in the image to be processed under the current posture acquired by the phase focusing method.

In an operation (b8), the depth information includes a depth value, and the mean value of the at least two depth information corresponding to each pixel point is determined.

In an operation (b9), the mean value corresponding to each pixel point serves as the first depth value of each pixel point in the image to be processed under the current posture.

In an operation (b10), the first three-dimensional coordinate corresponding to each pixel point in the image to be processed under the current posture is acquired.

In an operation (b11), the first three-dimensional coordinate is converted into the second three-dimensional coordinate according to the target posture information by using the coordinate conversion algorithm to obtain the second depth information of each pixel point in the image to be processed under the target posture. The second three-dimensional coordinate is a three-dimensional coordinate corresponding to each pixel point in the image to be processed under the target posture.

In an operation (b12), the initial internal parameter information of the camera is acquired, and the focal length value of the camera under the current posture is acquired.

In an operation (b13), the Hall value under the current posture is acquired through the Hall sensor.

In an operation (b14), the offset of the camera under the current posture is determined based on the Hall value.

In an operation (b15), the initial internal parameter information of the camera is updated according to the focal length value of the camera and the offset of the camera under the current posture to obtain the first internal parameter information of the camera.

In an operation (b16), the reprojection processing is performed on the image to be processed according to the current posture information, the first depth information, the target posture information, the second depth information, and the first internal parameter information to obtain the target image.

In the image processing method of this embodiment, at least one of the current altitude information, the current position information, and the current geographic location information of the camera is fused with the current angular velocity information and the current acceleration information. It is more accurate to obtain the current posture information of the camera according to the fusion of various information. The depth information of each pixel point in the same image to be processed under the current posture is acquired through three methods: the TOF camera, the dual-camera parallax ranging method, and the phase focusing method. The three types of depth information obtained by the three methods are fused to obtain richer and more comprehensive detail information, which makes the depth information of each pixel point in the image to be processed under the current posture more accurate. The coordinate of each pixel point under the current posture is converted into the corresponding coordinate under the target posture to determine the three-dimensional coordinate of the image to be processed in the stable state. The initial internal parameter information is updated according to the focal length value and the lens offset of the lens of the camera under the current posture, so that an object distance in the shooting image is closer to an object distance of the actual scene. According to the current posture information, the first depth information, the target posture information, the second depth information, and the first internal parameter information, the reprojection processing is performed on the image to be processed to obtain the pixel coordinate of each pixel point under the target posture, thereby outputting the target image with the same anti jitter performance. The image processing method of this embodiment realizes a combination of advantages of the optical image stabilization and an electronic image stabilization, it provides a theoretical basis, a data path, and an algorithm prototype for the collaboration between the two, and the anti jitter can be achieved before and after image sensor imaging.

Figure 9:
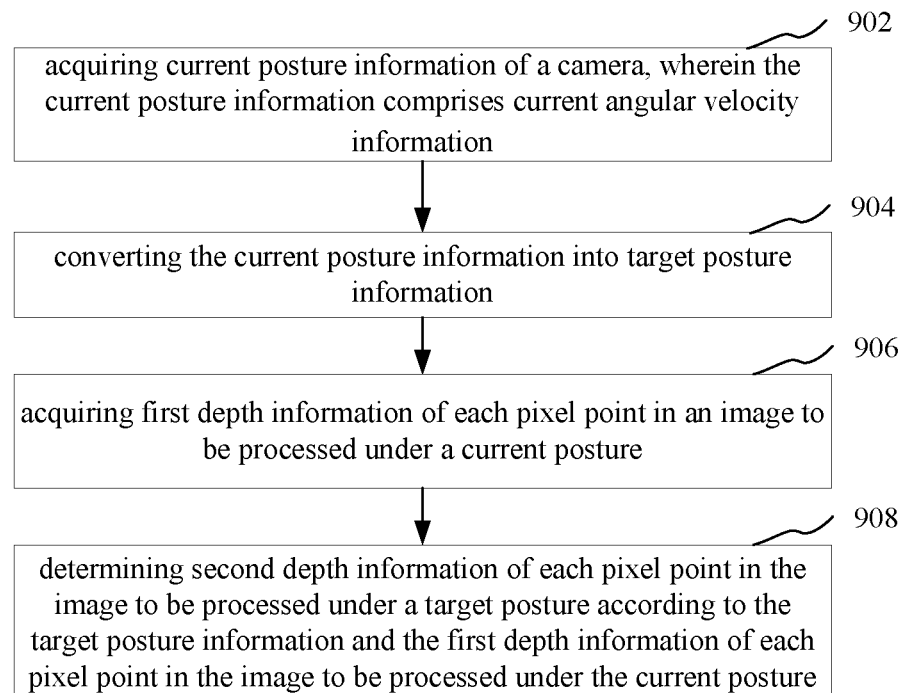
FIG. 9 illustrates a flowchart of a depth information acquisition method in one embodiment.

In one embodiment, as illustrated in FIG. 9, a method for acquiring the depth information is provided, including the following.

In an operation 902, the current posture information of the camera is acquired. The current posture information includes the current angular velocity information.

Specifically, the ISP processor or the central processor of the electronic device can acquire the three-axis angular velocity of the camera through the gyroscope. After the three-axis angular velocity is corrected and integrated in the time domain, the three-axis angular velocity information is output.

In an operation 904, the current posture information is converted into the target posture information.

Specifically, after the ISP processor or the central processor of the electronic device acquires the current posture information of the camera, it can make predictions based on the current posture and determine the target posture corresponding to the current posture. Furthermore, the current posture information can be converted into the target posture information through the target posture prediction algorithm.

In an operation 906, the first depth information of each pixel point in the image to be processed under the current posture is acquired.

Specifically, the ISP processor or the central processor of the electronic device can acquire the first depth information corresponding to each pixel point in the image to be processed under the current posture.

In an operation 908, according to the target posture information and the first depth information of each pixel point in the image to be processed under the current posture, the second depth information of each pixel point in the image to be processed under the target posture is determined.

Specifically, after the ISP processor or the central processor of the electronic device converts the current posture information into the target posture information, the target posture corresponding to the current posture is obtained. According to the current posture and the target posture, the first depth information of each pixel point in image to be processed under the current posture can be converted into the second depth information of each pixel point in image to be processed under the target posture.

In the depth information acquisition method of this embodiment, the current posture information of the camera is acquired. The current posture information includes the current angular velocity information. The current posture information is converted into the target posture information. The first depth information of each pixel point in the image to be processed under the current posture is acquired. According to the target posture information and the first depth information of each pixel point in the image to be processed under the current posture, the second depth information of each pixel point in the image to be processed under the target posture is determined, and the accurate depth information of the image to be processed under the target posture is acquired.

In one embodiment, the current posture information further includes at least one of the current altitude information, the current position information, and the current geographic location information. The operation of acquiring the current posture information of the camera includes the following.

The current angular velocity information of the camera is acquired, and at least one of the current altitude information, the current position information, and the current geographic location information of the camera is acquired. The fusion processing is performed on at least one of the current altitude information, the current position information, and the current geographic location information with the current angular velocity information to obtain the current posture information of the camera.

Specifically, the ISP processor or the central processor of the electronic device can acquire the angular velocity information of the camera under the current posture through the gyroscope, the height of the camera from the ground plane under the current posture through the altimeter, the orientation of the camera under the current posture through the compass, and the geographic coordinates of the camera under the current posture through the GPS.

Then, the ISP processor or the central processor of the electronic device can select at least one of the current altitude information, the current position information, and the current geographic location information. The fusion processing is performed on the selected information and the current angular velocity information to obtain the current posture information of the camera.

Furthermore, the selected information and the current angular velocity information can be subjected to the Kalman Filtering process to realize the fusion of the information and obtain the current posture information of the camera. The Kalman Filtering is essentially a data fusion algorithm, which fuse data with the same purpose, from different sensors, and with different units to obtain a more accurate target measurement value.

The image processing method of this embodiment, the current angular velocity information of the camera is acquired, and at least one of the current altitude information, the current position information, and the current geographic location information of the camera is acquired. A variety of different information used to characterize the current posture of the camera can be obtained. The fusion processing is performed on at least one of the current altitude information, the current position information, and the current geographic location information with the current angular velocity information to obtain the current posture information of the camera. A variety of ways to obtain the current posture information of the camera are provided. Through the fusion of different information, the current posture information of the camera can be obtained more accurately.

In one embodiment, the current posture information further includes current acceleration information. The method further includes an operation of acquiring the current acceleration information of the camera.

The operation of performing the fusion processing on at least one of the current altitude information, the current position information, and the current geographic location information with the current angular velocity information to obtain the current posture information of the camera includes that the fusion processing is performed on at least one of the current altitude information, the current position information, and the current geographic location information of the camera with the current angular velocity information and the current acceleration information to obtain the current posture information of the camera.

Specifically, the ISP processor or the central processor of the electronic device can acquire a three-axis acceleration through an accelerometer, and the three-axis acceleration can be corrected and integrated in two time domains to obtain three-axis position information of the camera. The three-axis position information can be converted into the translation matrix of the camera under the world coordinate system. Then, at least one of the current altitude information, the current position information, and the current geographic location information of the camera can be selected, and the fusion processing is performed on the selected information with the current angular velocity information and the current acceleration information. The fusion processing can be implemented by fusion algorithms such as Kalman Filtering algorithm.

In the image processing method of this embodiment, by acquiring the current acceleration information, the fusion processing is performed on at least one of the current altitude information, the current position information, and the current geographic location information with the current angular velocity information and the current acceleration information. A variety of ways to obtain the current posture information of the camera are provided. Also, the current acceleration information is also used as a reference for acquiring the current posture information, which can more accurately acquire the current posture information of the camera.

It should be understood that although operations in the flowcharts of FIG. 2 to FIG. 9 are illustrated in sequence indicated by the arrows, these operations are not necessarily executed in sequence indicated by the arrows. Unless clearly stated herein, the execution of these operations is not strictly limited in sequence, and these operations can be executed in other sequence. Moreover, at least part of the operations in FIG. 2 to FIG. 9 may include multiple sub-operations or multiple stages. These sub-operations or stages are not necessarily executed at the same time, but may be performed in different times. The sequence of execution of these sub-operations or stages is not necessarily sequential, but can be executed in turn or alternately with other operations or at least part of the sub-operations or stages of other operations.

Figure 10:
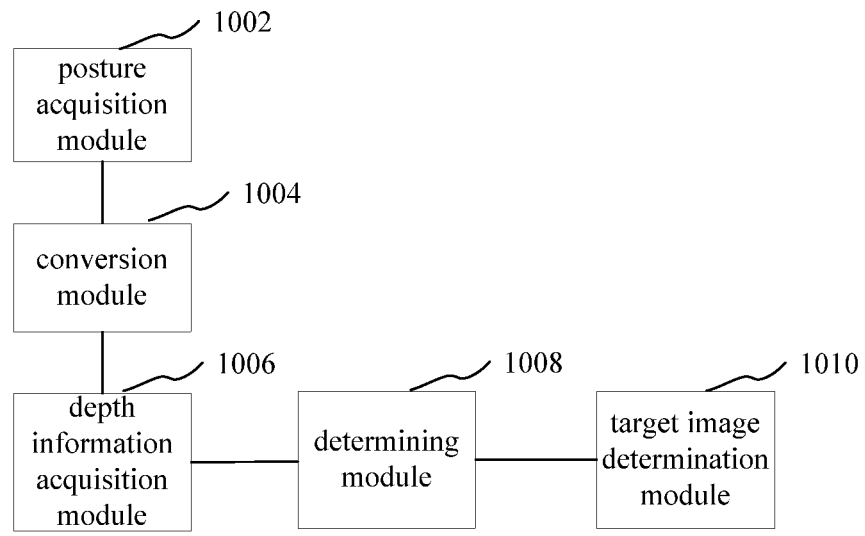
FIG. 10 illustrates a structural block diagram of an image processing device in one embodiment.

FIG. 10 illustrates a structural block diagram of an image processing device in one embodiment. As shown in FIG. 10, the image processing device includes a posture acquisition module 1002, a conversion module 1004, a depth information acquisition module 1006, a determining module 1008, and a target image determination module 1010.

The posture acquisition module 1002 is configured to acquire current posture information of a camera. The current posture information includes current angular velocity information.

The conversion module 1004 is configured to convert the current posture information into target posture information.

The depth information acquisition module 1006 is configured to acquire first depth information of each pixel point in an image to be processed under a current posture.

The determining module 1008 is configured to determine second depth information of each pixel point in the image to be processed under a target posture according to the target posture information and the first depth information of each pixel point in the image to be processed under the current posture.

The target image determination module 1010 is configured to acquire first internal parameter information of the camera, and perform a reprojection processing on the image to be processed according to the current posture information, the first depth information, the target posture information, the second depth information, and the first internal parameter information to obtain a target image.

In the image processing device of the embodiment, the current posture information of the camera is acquired. The current posture information includes the current angular velocity information. The current posture information is converted into the target posture information. The first depth information of each pixel point in the image to be processed under the current posture is acquired. The second depth information of each pixel point in the image to be processed under the target posture is determined according to the target posture information and the first depth information of each pixel point in the image to be processed under the current posture. The first internal parameter information of the camera is acquired. The reprojection processing is performed on the image to be processed according to the current posture information, the first depth information, the target posture information, the second depth information, and the first internal parameter information to obtain the target image. It can achieve targeted anti jitter for each pixel point, making the anti jitter performance of the captured image more stable.

In one embodiment, the current posture information further includes at least one of current altitude information, current position information, and current geographic location information.

The posture acquisition module 1002 is also configured to acquire the current angular velocity information of the camera, and acquire at least one of the current altitude information, the current position information, and the current geographic location information of the camera. The fusion processing is performed on at least one of the current altitude information, the current position information, and the current geographic location information with the current angular velocity information to obtain the current posture information of the camera.

The current angular velocity information of the camera is acquired, and at least one of the current altitude information, the current position information, and the current geographic location information of the camera is acquired. A variety of different information used to characterize the current posture of the camera can be obtained. The fusion processing is performed on at least one of the current altitude information, the current position information, and the current geographic location information with the current angular velocity information to obtain the current posture information of the camera. A variety of ways to obtain the current posture information of the camera are provided. Through the fusion of different information, the current posture information of the camera can be obtained more accurately.

In one embodiment, the current posture information further includes current acceleration information.

The posture acquisition module 1002 is also configured to acquire the current acceleration information of the camera. The fusion processing is performed on at least one of the current altitude information, the current position information, and the current geographic location information of the camera with the current angular velocity information and the current acceleration information to obtain the current posture information of the camera.

By acquiring the current acceleration information, the fusion processing is performed on at least one of the current altitude information, the current position information, and the current geographic location information with the current angular velocity information and the current acceleration information. A variety of ways to obtain the current posture information of the camera are provided. Also, the current acceleration information is also used as a reference for acquiring the current posture information, which can more accurately acquire the current posture information of the camera.

In one embodiment, the conversion module 1004 is also configured to acquire current moving scenario information, and determine target posture information according to the current moving scenario information and the current posture information. In this embodiment, according to the current movement state information of the camera, the direction of the jitter to be eliminated on the current posture and the direction of the jitter that does not need to be eliminated can be determined. The targeted processing of the information in all directions in the current posture information makes the predicted target posture information more accurate and more in line with an actual shooting scene.

In one embodiment, the conversion module 1004 is also configured to acquire the current position information and the current geographic location information of the camera, and perform the fusion processing on the current position information and the current geographic location information to obtain the current moving scenario information. By acquiring the current position information and the current geographic location information of the camera, the change of the position and geographic coordinates of the camera can be determined. The current position information and the current geographic location information are subjected to the fusion processing. According to the change of the position and the geographic coordinates of the camera, the movement state of the camera during the shooting process can be determined intuitively and accurately.

In one embodiment, the depth information acquisition module 1006 is also configured to acquire at least two depth information of initial depth information, third depth information, and fourth depth information. The initial depth information is depth information of each pixel point in the image to be processed under the current posture acquired by a depth camera. The third depth information is depth information of each pixel point in the image to be processed under the current posture acquired by a dual-camera parallax ranging method. The fourth depth information is depth information of each pixel point in the image to be processed under the current posture acquired by a phase focusing method. A fusion correction processing is performed on the at least two acquired depth information to obtain the first depth information of each pixel point in the image to be processed under the current posture.

In the image processing device of this embodiment, the depth information of the same image to be processed under the current posture is acquired in at least two ways to obtain at least two types of depth information. By fusing and superimposing at least two kinds of acquired depth information with each other, richer and more comprehensive detail information can be obtained, and thus more accurate depth information of each pixel point in the image to be processed can be obtained.

In one embodiment, the depth information includes a depth value. The depth information acquisition module 1006 is also configured to determine a mean value of the at least two depth information corresponding to each pixel point. The mean value corresponding to each pixel point serves as the first depth value of each pixel point in the image to be processed under the current posture.

In the image processing device of this embodiment, the mean value of at least two depth information corresponding to each pixel point is determined. The mean value corresponding to each pixel point serves as the first depth value of each pixel point in the image to be processed under the current posture. A variety of ways to obtain the first depth value are provided. Through the fusion of different depth information, richer detailed information can be obtained in the image to be processed, so that the calculated depth information of each pixel point in the image to be processed is more accurate.

In one embodiment, the depth information acquisition module 1006 is also configured to acquiring initial depth information of each pixel point in the image to be processed under the current posture; acquiring depth information of a focus region under the current posture; and performing a fusion correction processing on the initial depth information and the depth information of the focus region under the current posture to obtain the first depth information of each pixel point in the image to be processed under the current posture.

In the image processing device of this embodiment, the initial depth information of each pixel point in the image to be processed under the current posture is acquired, the depth information of the focus region under the current posture is acquired, and two kinds of depth information with different precision of the same image to be processed under the current posture can be obtained. The fusion correction processing is performed on the initial depth information and the depth information of the focus region under the current posture to obtain the first depth information of each pixel point in the image to be processed under the current posture. High-precision partial depth information can be applied to each part of the image to be processed. Thus, more accurate depth information of the image to be processed is acquired, that is, the first depth information of each pixel point in the image to be processed under the current posture is acquired.

In one embodiment, the depth information acquisition module 1006 is also configured to determine the focus region under the current posture, and acquire a corresponding focal length value according to the focus region; and acquiring corresponding depth information according to the focal length value, and serving the depth information corresponding to the focal length value as the depth information of the focus region under the current posture. The focal length value corresponding to the focus region under the current posture can be acquired according to the corresponding relationship between the preset focus region and the focal length value. According to the corresponding relationship between the preset focal length value and the depth information, the depth information corresponding to the focal length value of the lens under the current posture is acquired. Thus, the depth information corresponding to the focus region under the current posture can be acquired indirectly.

In one embodiment, the depth information acquisition module 1006 is also configured to acquire a focus curve, and acquire the depth information corresponding to the focal length value from the focus curve. The focus curve is a correlation curve between the focal length value and the depth information. Through the focus curve, the depth information corresponding to the focal length value of the focus region under the current posture can be quickly and simply acquired, so that the depth information corresponding to the focus region under the current posture can be obtained indirectly.

In one embodiment, the determining module 1008 is also configured to acquire a first three-dimensional coordinate corresponding to each pixel point in the image to be processed under the current posture; and converting the first three-dimensional coordinate to a second three-dimensional coordinate according to the target posture information by using a coordinate conversion algorithm to obtain the second depth information of each pixel point in the image to be processed under the target posture. The second three-dimensional coordinate is a three-dimensional coordinate corresponding to each pixel point in the image to be processed under the target posture. By using the coordinate conversion algorithm, the coordinate of each pixel point in the image to be processed under the current posture is converted into a corresponding coordinate under the target posture. Thus, the reprojection processing can be performed on each pixel point in a targeted manner to achieve targeted anti jitter for each pixel point.

In one embodiment, the determining module 1008 is also configured to acquire initial internal parameter information of the camera, acquire a focal length value of the camera under the current posture, and update the initial internal parameter information of the camera according to the focal length value of the camera under the current posture to obtain the first internal parameter information of the camera. The real-time focal length value of the camera under the current posture is acquired to update the internal parameter information of the camera. It can solve the problem that the pixel points in the image to be processed are projected to the same unit plane with the same focal length value in a traditional image processing method, resulting in the inability to detect a true depth information of each pixel point of the image. The image processing method of this embodiment improves the accuracy of the detection of depth information.

In one embodiment, the determining module 1008 is also configured to acquire a Hall value under the current posture through a Hall sensor, and determine an offset of the camera under the current posture based on the Hall value, and update the initial internal parameter information of the camera according to the focal length value of the camera and the offset of the camera under the current posture to obtain the first internal parameter information of the camera. The Hall value under the current posture is acquired through the Hall sensor, and the offset of the camera under the current posture is determined based on the Hall value, so as to obtain the real-time offset of the camera. The initial internal parameter information of the camera is updated according to the focal length value of the camera and the offset of the camera under the current posture, which can better meet the anti jitter requirements of shooting under zooming conditions.

Figure 11:
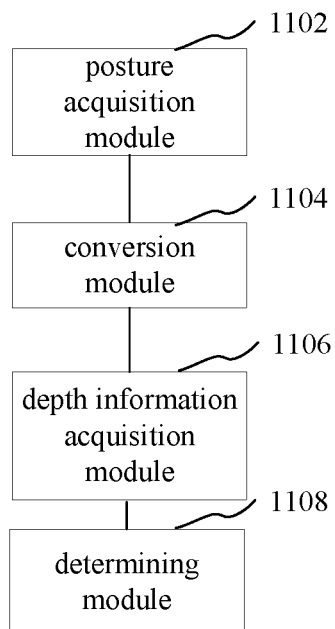
FIG. 11 illustrates a structural block diagram of a depth information acquisition device in one embodiment.

In one embodiment, as shown in FIG. 11, a depth information acquisition device is provided, including the following.

A posture acquisition module 1102 is configured to acquire current posture information of a camera. The current posture information includes current angular velocity information.

A conversion module 1104 is configured to convert the current posture information into target posture information.

A depth information acquisition module 1106 is configured to acquire first depth information of each pixel point in an image to be processed under a current posture.

A determining module 1108 is configured to determine second depth information of each pixel point in the image to be processed under a target posture according to the target posture information and the first depth information of each pixel point in the image to be processed under the current posture.

In the depth information acquisition device of this embodiment, the current posture information of the camera is acquired. The current posture information includes the current angular velocity information. The current posture information is converted into the target posture information. The first depth information of each pixel point in the image to be processed under the current posture is acquired. According to the target posture information and the first depth information of each pixel point in the image to be processed under the current posture, the second depth information of each pixel point in the image to be processed under the target posture is determined, and the accurate depth information of the image to be processed under the target posture is acquired.

In one embodiment, the current posture information further includes at least one of current altitude information, current position information, and current geographic location information. The posture acquisition module 1102 is also configured to acquire the current angular velocity information of the camera, and acquire at least one of the current altitude information, the current position information, and the current geographic location information of the camera. The fusion processing is performed on at least one of the current altitude information, the current position information, and the current geographic location information with the current angular velocity information to obtain the current posture information of the camera.

The current angular velocity information of the camera is acquired, and at least one of the current altitude information, the current position information, and the current geographic location information of the camera is acquired. A variety of different information used to characterize the current posture of the camera can be obtained. The fusion processing is performed on at least one of the current altitude information, the current position information, and the current geographic location information with the current angular velocity information to obtain the current posture information of the camera. A variety of ways to obtain the current posture information of the camera are provided. Through the fusion of different information, the current posture information of the camera can be obtained more accurately.

In one embodiment, the current posture information also includes current acceleration information. The posture acquisition module 1102 is also configured to acquire the current acceleration information of the camera, perform the fusion processing on at least one of the current altitude information, the current position information, and the current geographic location information of the camera with the current angular velocity information and the current acceleration information, and acquire the current posture information of the camera.

By acquiring the current acceleration information, the fusion processing is performed on at least one of the current altitude information, the current position information, and the current geographic location information of the camera with the current angular velocity information and the current acceleration information. A variety of ways to obtain the current posture information of the camera are provided. Also, the current acceleration information is also used as a reference for acquiring the current posture information, which can more accurately acquire the current posture information of the camera.

The division of each module in the image processing device described above is only for illustration. In other embodiments, the image processing device and the depth information acquisition device can be divided into different modules as needed to complete all or part of the functions of the aforementioned image processing device and depth information acquisition device.

Figure 12:
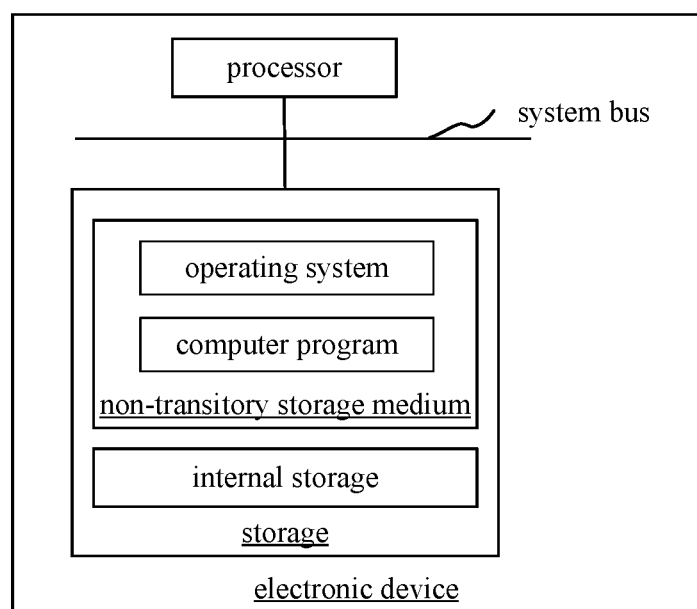
FIG. 12 illustrates a schematic diagram of an internal structure of an electronic device in one embodiment.

FIG. 12 illustrates a schematic diagram of an internal structure of an electronic device in one embodiment. As illustrated in FIG. 12, the electronic device includes a processor and a storage connected by a system bus. The processor is configured to provide calculation and control capabilities to support the operations of the entire electronic device. The storage can include a non-transitory storage medium and internal storage. The non-transitory storage medium stores an operating system and a computer program. The computer program can be executed by the processor to implement an image processing method and a depth information acquisition method provided in the following embodiments. The internal storage provides a cache operating environment for the computer program of the operating system in the non-transitory storage medium. The electronic device can be a mobile phone, a tablet computer, a personal digital assistant, or a wearable device.

Each module in the image processing device and the depth information acquisition device in the embodiments of the present disclosure may be implemented in a form of the computer program. The computer program can be run on a terminal device or a server. The program module composed of the computer program can be stored on the storage of the terminal device or the server. When the computer program is executed by the processor, the operations of the method described in the embodiments of the present disclosure are realized.

An embodiment of the present disclosure also provides a computer-readable storage medium. One or more non-transitory computer-readable storage medium containing computer-executable instructions. When the computer-executable instructions are executed by one or more processors, the processor is caused to execute the operations of the image processing method. Any reference to memory, storage, database, or other medium as used in the embodiments of the present disclosure can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

The above-mentioned embodiments only express several implementations of the present disclosure, and the description is relatively specific and detailed, but it should not be understood as a limitation of a scope of the present disclosure. It should be noted that for those of ordinary skill in the art, without departing from a concept of the present disclosure, several modifications and improvements can be made. These all belong to the scope of protection of the present disclosure. Therefore, the protection scope of the present disclosure shall be subject to the appended claims.

What is claimed is:

1. An image processing method, comprising:
converting current posture information of a camera into target posture information, wherein the current posture information comprises current angular velocity information;
acquiring first depth information of each pixel point in an image to be processed under a current posture of the camera;
determining second depth information of each pixel point in the image to be processed under a target posture of the camera according to the target posture information and the first depth information of each pixel point in the image to be processed under the current posture of the camera; and
obtaining a target image through reprojecting the image to be processed according to the current posture information, the first depth information, the target posture information, the second depth information, and first internal parameter information of the camera, wherein the operation of acquiring the first depth information of each pixel point in the image to be processed under the current posture of the camera comprises:
acquiring at least two depth information of initial depth information, third depth information, and fourth depth information, wherein the initial depth information is depth information of each pixel point in the image to be processed under the current posture of the camera acquired by a depth camera;
the third depth information is depth information of each pixel point in the image to be processed under the current posture of the camera acquired by a dual-camera parallax ranging method; and
the fourth depth information is depth information of each pixel point in the image to be processed under the current posture of the camera acquired by a phase focusing method; and
performing a fusion correction processing on the at least two depth information to obtain the first depth information of each pixel point in the image to be processed under the current posture of the camera.

2. The image processing method according to claim 1, wherein the current posture information further comprises at least one of current altitude information, current position information, and current geographic location information, and an operation of acquiring the current posture information of the camera comprises:
acquiring the current angular velocity information of the camera, and acquiring at least one of the current altitude information, the current position information, and the current geographic location information of the camera; and
performing a fusion processing on at least one of the current altitude information, the current position information, and the current geographic location information with the current angular velocity information to obtain the current posture information of the camera.

3. The image processing method according to claim 2, wherein the current posture information further comprises current acceleration information, the image processing method further comprises acquiring the current acceleration information of the camera, and the wherein an operation of performing the fusion processing on at least one of the current altitude information, the current position information, and the current geographic location information with the current angular velocity information to obtain the current posture information of the camera comprises:
performing the fusion processing on at least one of the current altitude information, the current position information, and the current geographic location information of the camera with the current angular velocity information and the current acceleration information to obtain the current posture information of the camera.

4. The image processing method according to claim 1, wherein the operation of converting the current posture information into the target posture information comprises:
acquiring current moving scenario information; and
determining the target posture information according to the current moving scenario information and the current posture information.

5. The image processing method according to claim 4, wherein the operation of acquiring the current moving scenario information comprises:

acquiring current position information and current geographic location information of the camera; and performing a fusion processing on the current position information and the current geographic location information to obtain the current moving scenario information.

6. The image processing method according to claim 1, wherein depth information comprises a depth value, and the operation of performing the fusion correction processing on the at least two depth information to obtain the first depth information of each pixel point in the image to be processed under the current posture of the camera comprises:

determining a mean value of the at least two depth information corresponding to each pixel point; and serving the mean value corresponding to each pixel point as a first depth value of each pixel point in the image to be processed under the current posture of the camera.

7. The image processing method according to claim 1, wherein the operation of determining the second depth information of each pixel point in the image to be processed under the target posture of the camera according to the target posture information and the first depth information of each pixel point in the image to be processed under the current posture of the camera comprises:

acquiring a first three-dimensional coordinate corresponding to each pixel point in the image to be processed under the current posture of the camera; and converting the first three-dimensional coordinate to a second three-dimensional coordinate according to the target posture information by using a coordinate conversion algorithm to obtain the second depth information of each pixel point in the image to be processed under the target posture of the camera, wherein the second three-dimensional coordinate is a three-dimensional coordinate corresponding to each pixel point in the image to be processed under the target posture of the camera.

8. The image processing method according to claim 1, further comprising:

acquiring initial internal parameter information of the camera;

acquiring a focal length value of the camera under the current posture of the camera; and updating the initial internal parameter information of the camera according to the focal length value of the camera under the current posture of the camera to obtain the first internal parameter information of the camera.

9. The image processing method according to claim 8, further comprising:

acquiring a Hall value under the current posture of the camera through a Hall sensor; and determining an offset of the camera under the current posture of the camera based on the Hall value, wherein the operation of updating the initial internal parameter information of the camera according to the focal length value of the camera under the current posture of the camera to obtain the first internal parameter information of the camera comprises:

updating the initial internal parameter information of the camera according to the focal length value of the camera and the offset of the camera under the current posture of the camera to obtain the first internal parameter information of the camera.

10. A depth information acquisition method, comprising:

acquiring current posture information of a camera, wherein the current posture information comprises current angular velocity information;

converting the current posture information into target posture information;

acquiring first depth information of each pixel point in an image to be processed under a current posture of the camera; and determining second depth information of each pixel point in the image to be processed under a target posture of the camera according to the target posture information and the first depth information of each pixel point in the image to be processed under the current posture of the camera, wherein the step of acquiring the first depth information of each pixel point in the image to be processed under the current posture of the camera comprises:

acquiring at least two depth information of initial depth information, third depth information, and fourth depth information, wherein the initial depth information is depth information of each pixel point in the image to be processed under the current posture of the camera acquired by a depth camera;

the third depth information is depth information of each pixel point in the image to be processed under the current posture of the camera acquired by a dual-camera parallax ranging method; and the fourth depth information is depth information of each pixel point in the image to be processed under the current posture of the camera acquired by a phase focusing method; and performing a fusion correction processing on the at least two depth information to obtain the first depth information of each pixel point in the image to be processed under the current posture of the camera.

11. The depth information acquisition method according to claim 10, wherein the current posture information further comprises at least one of current altitude information, current position information, and current geographic location information, and the operation of acquiring the current posture information of the camera comprises:

acquiring the current angular velocity information of the camera, and acquiring at least one of the current altitude information, the current position information, and the current geographic location information of the camera; and performing a fusion processing on at least one of the current altitude information, the current position information, and the current geographic location information with the current angular velocity information to obtain the current posture information of the camera.

12. The depth information acquisition method according to claim 11, wherein the current posture information further comprises current acceleration information, the depth information acquisition method further comprises acquiring the current acceleration information of the camera, and the operation of performing the fusion processing on at least one of the current altitude information, the current position information, and the current geographic location information with the current angular velocity information to obtain the current posture information of the camera comprises:

performing the fusion processing on at least one of the current altitude information, the current position information, and the current geographic location information of the camera with the current angular velocity information and the current acceleration information to obtain the current posture information of the camera.

13. A terminal device, comprising:
one or more processors; and
a memory configured to store instructions which, when executed by the one or more processors, cause the one or more processors to:
convert current posture information of a camera into target posture information, wherein the current posture information comprises current angular velocity information;
acquire first depth information of each pixel point in an image to be processed under a current posture of the camera;
determine second depth information of each pixel point in the image to be processed under a target posture of the camera according to the target posture information and the first depth information of each pixel point in the image to be processed under the current posture of the camera; and
obtain a target image through reprojecting the image to be processed according to the current posture information, the first depth information, the target posture information, the second depth information, and first internal parameter information of the camera, wherein the operation that acquire the first depth information of each pixel point in the image to be processed under the current posture of the camera comprises:
acquiring at least two depth information of initial depth information, third depth information, and fourth depth information, wherein the initial depth information is depth information of each pixel point in the image to be processed under the current posture of the camera acquired by a depth camera, the third depth information is depth information of each pixel point in the image to be processed under the current posture of the camera acquired by a dual-camera parallax ranging method, and the fourth depth information is depth information of each pixel point in the image to be processed under the current posture of the camera acquired by a phase focusing method; and
performing a fusion correction processing on the at least two depth information to obtain the first depth information of each pixel point in the image to be processed under the current posture of the camera.

14. The terminal device according to claim 13, wherein the current posture information further comprises at least one of current altitude information, current position information, and current geographic location information, and the instructions further cause the one or more processors to:
acquire the current angular velocity information of the camera, and acquire at least one of the current altitude information, the current position information, and the current geographic location information of the camera; and
perform a fusion processing on at least one of the current altitude information, the current position information, and the current geographic location information with the current angular velocity information to obtain the current posture information of the camera.

15. The terminal device according to claim 13, wherein the instructions further cause the one or more processors to:
acquire current moving scenario information; and
determine the target posture information according to the current moving scenario information and the current posture information.

16. An image processing method, comprising:
converting current posture information of a camera into target posture information, the current posture information comprising current angular velocity information;
acquiring first depth information of each pixel point in an image to be processed under a current posture of the camera;
determining second depth information of each pixel point in the image to be processed under a target posture of the camera according to the target posture information and the first depth information of each pixel point in the image to be processed under the current posture of the camera; and
obtaining a target image through reprojecting the image to be processed according to the current posture information, the first depth information, the target posture information, the second depth information, and first internal parameter information of the camera, wherein the operation of acquiring the first depth information of each pixel point in the image to be processed under the current posture of the camera comprises:
acquiring initial depth information of each pixel point in the image to be processed under the current posture of the camera;
acquiring depth information of a focus region under the current posture of the camera; and
performing a fusion correction processing on the initial depth information and the depth information of the focus region under the current posture of the camera to obtain the first depth information of each pixel point in the image to be processed under the current posture of the camera.

17. The image processing method according to claim 16, wherein the operation of acquiring the depth information of the focus region under the current posture of the camera comprises:
determining the focus region under the current posture of the camera, and acquiring a corresponding focal length value according to the focus region; and
acquiring corresponding depth information according to the focal length value and serving the depth information corresponding to the focal length value as the depth information of the focus region under the current posture of the camera.

18. The image processing method according to claim 16, wherein the operation of acquiring the corresponding depth information according to the focal length value comprises:
acquiring a focus curve and acquiring the depth information corresponding to the focal length value from the focus curve, wherein the focus curve is a correlation curve between the focal length value and the depth information.

* * * * *